United States Patent
Gallagher et al.

(10) Patent No.: US 7,556,471 B1
(45) Date of Patent: Jul. 7, 2009

(54) INTER-SHIP PERSONNEL TRANSFER DEVICE AND METHOD OF MOVING BETWEEN COMPACTED STATE AND NON-COMPACTED STATE

(75) Inventors: Sean M. Gallagher, Philadelphia, PA (US); Stuart G. Ullman, Kensington, MD (US); Ryan T. Hayleck, Fulton, MD (US); Christopher J. Doyle, Panama City Beach, FL (US); John F. O'Dea, Laurel, MD (US); Robert W. Anderson, Alexandria, VA (US); Kellie L. Redcay, Pottstown, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 221 days.

(21) Appl. No.: 11/527,666

(22) Filed: Sep. 18, 2006

Related U.S. Application Data

(60) Provisional application No. 60/797,083, filed on Apr. 22, 2006, provisional application No. 60/797,085, filed on Apr. 21, 2006.

(51) Int. Cl.
 *B63B 27/00* (2006.01)
 *B63B 35/00* (2006.01)
(52) U.S. Cl. .................... 414/803; 414/139.5
(58) Field of Classification Search ............ 220/6; 296/173, 64, 65.01, 65.05, 65.09; 414/139.5; 52/66, 79.5, 8
 See application file for complete search history.

(56) References Cited

U.S. PATENT DOCUMENTS

| | | | | |
|---|---|---|---|---|
| 2,972,430 A | * | 2/1961 | Johnson | 220/1.5 |
| 3,694,022 A | * | 9/1972 | Dontigny | 296/170 |
| 4,214,669 A | * | 7/1980 | McQuiston | 220/6 |
| 4,412,598 A | | 11/1983 | Kimon et al. | |
| 4,630,542 A | * | 12/1986 | Peyre et al. | 104/114 |

(Continued)

FOREIGN PATENT DOCUMENTS

| FR | 2633884 A1 | * | 1/1990 |
|---|---|---|---|
| WO | WO 2005002916 A1 | * | 1/2005 |

OTHER PUBLICATIONS

U.S. Appl. No. 60/797,083, filed Apr. 22, 2006, entitled "Inter-Ship Personnel Transfer Device," joint inventors Sean M. Gallagher, Stuart G. Ullman, Ryan T. Hayleck, Christopher J. Doyle, John F. O'Dea, Robert W. Anderson, and Kellie L. Redcay.

(Continued)

*Primary Examiner*—Gregory W Adams
(74) *Attorney, Agent, or Firm*—Howard Kaiser

(57) ABSTRACT

The present invention's vehicle, suitable for being hoisted while carrying people between destinations, is compactable and de-compactable. As typically embodied, the vehicle includes a box-shaped open frame, plural chairs, and a shock-absorbent base. The frame includes a rectangular floor panel, a rectangular ceiling panel, and four posts connecting the floor and ceiling panels. Each post is foldable via a medial hinge to half its unfolded length, and is attached in a hinged manner at its opposite ends to respective corner portions of the floor panel and the ceiling panel. Each chair is mounted on the floor panel and can be folded down to a position adjacent to the top surface of the floor panel using hinges variously connecting chair components including a seat, a chair back, two side safety restraints, and a chair support. The shock-absorbent base is solid or inflatable and is attached beneath the floor panel.

8 Claims, 17 Drawing Sheets

U.S. PATENT DOCUMENTS

| | | | | |
|---|---|---|---|---|
| 4,630,627 | A | * | 12/1986 | Windows et al. ............. 135/122 |
| 5,160,286 | A | | 11/1992 | Hill |
| 5,203,425 | A | | 4/1993 | Wehmeyer |
| 5,713,710 | A | * | 2/1998 | Strong et al. ............. 414/139.5 |
| 6,131,224 | A | | 10/2000 | Bernal |
| 6,220,668 | B1 | * | 4/2001 | Scheffzuck ................. 297/391 |
| 6,267,426 | B1 | * | 7/2001 | Seibold ................... 296/37.16 |
| 6,296,315 | B1 | * | 10/2001 | Jensen ................... 297/452.14 |
| 6,309,160 | B1 | | 10/2001 | Greene, Jr. |
| 2001/0018015 | A1 | * | 8/2001 | Johnson ................... 414/139.5 |

OTHER PUBLICATIONS

U.S. Appl. No. 60/797,085, filed Apr. 21, 2006, entitled "Cargo Transfer Method and Apparatus," joint inventors Robert W. Anderson, Stuart G. Ullman, Kellie L. Redcay, Ryan T. Hayleck, John F. O'Dea, Sean M. Gallagher, Christopher J. Doyle, and Donald R. Jacobson.

Keebom Kang, Kenneth H. Doerr, Hyle A. Bryan, and Gregorio Ameyugo, "An Analysis of STOM (Ship to Objective Maneuver) in Sea Based Logistics," *Proceedings of the 2002 Winter Simulation Conference*, Dec. 8-11, 2002, San Diego, California, pp. 905-910.

\* cited by examiner

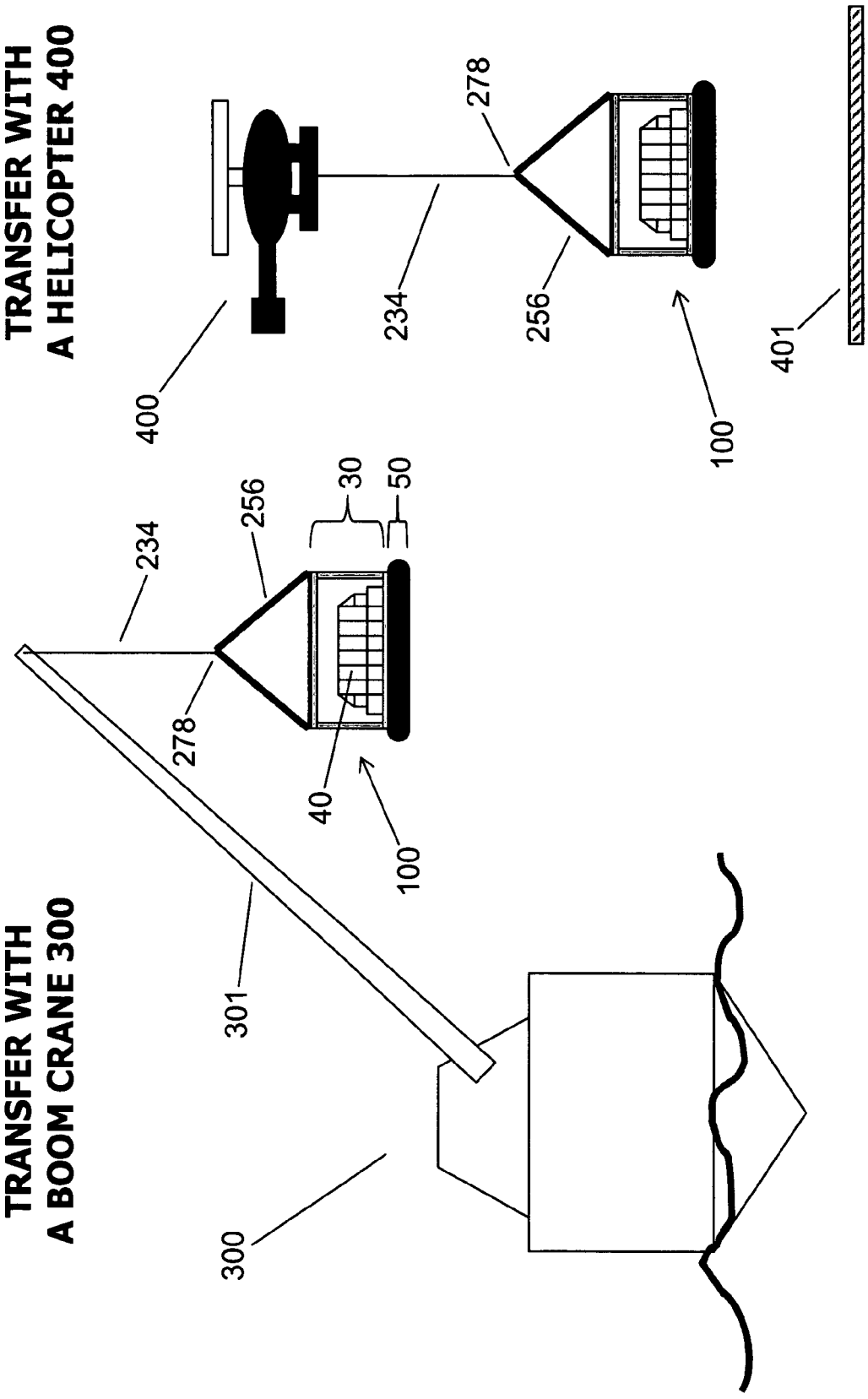

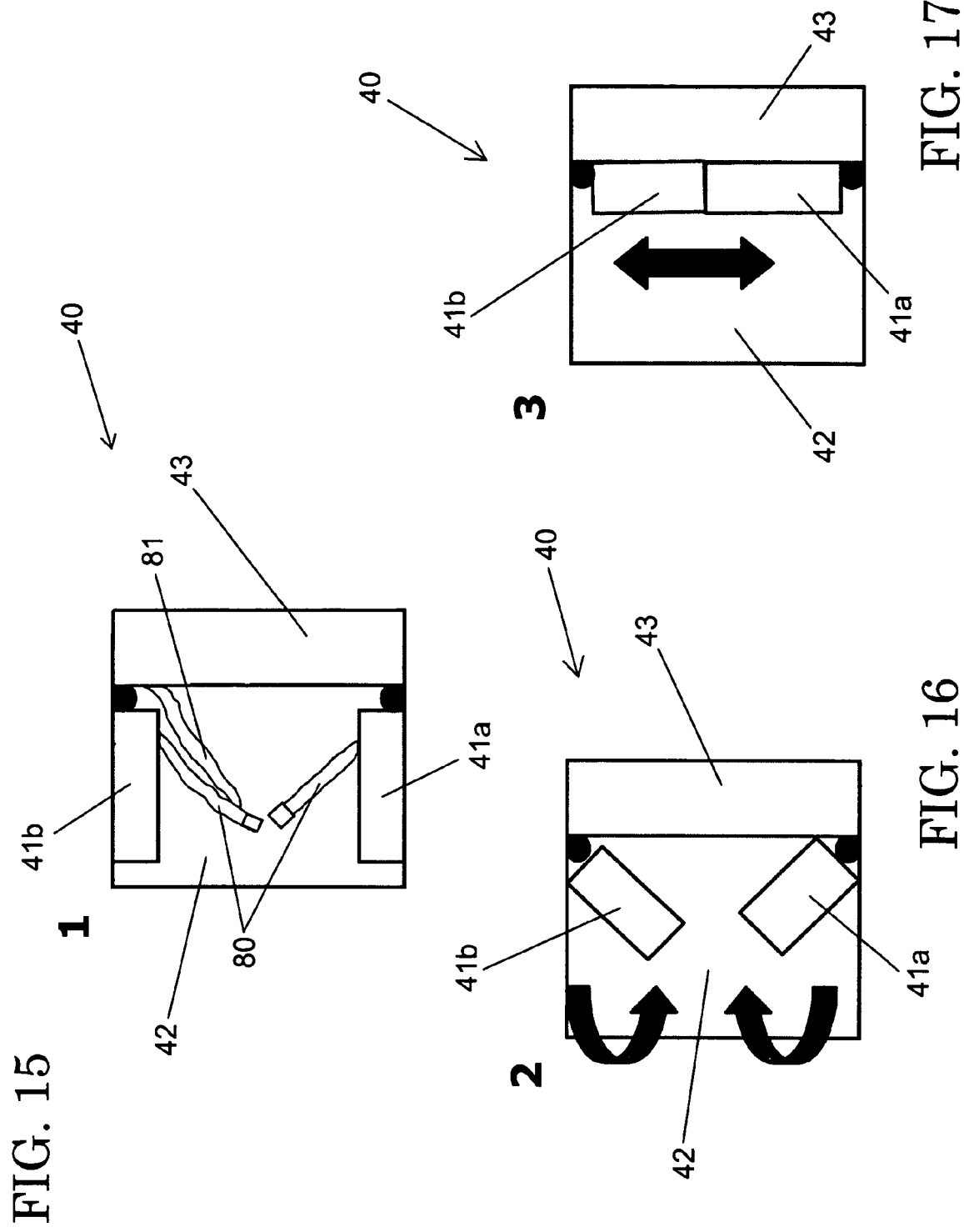

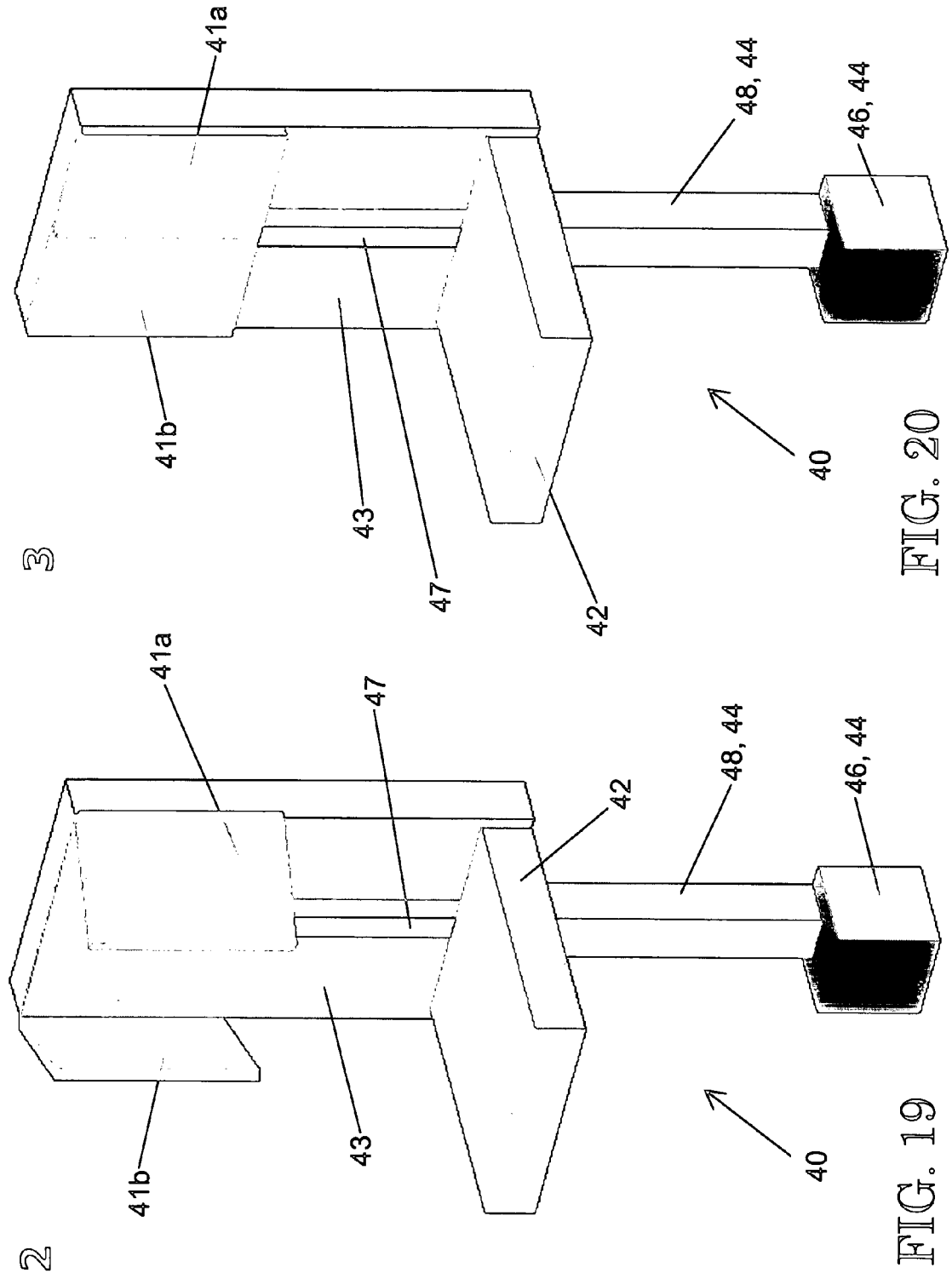

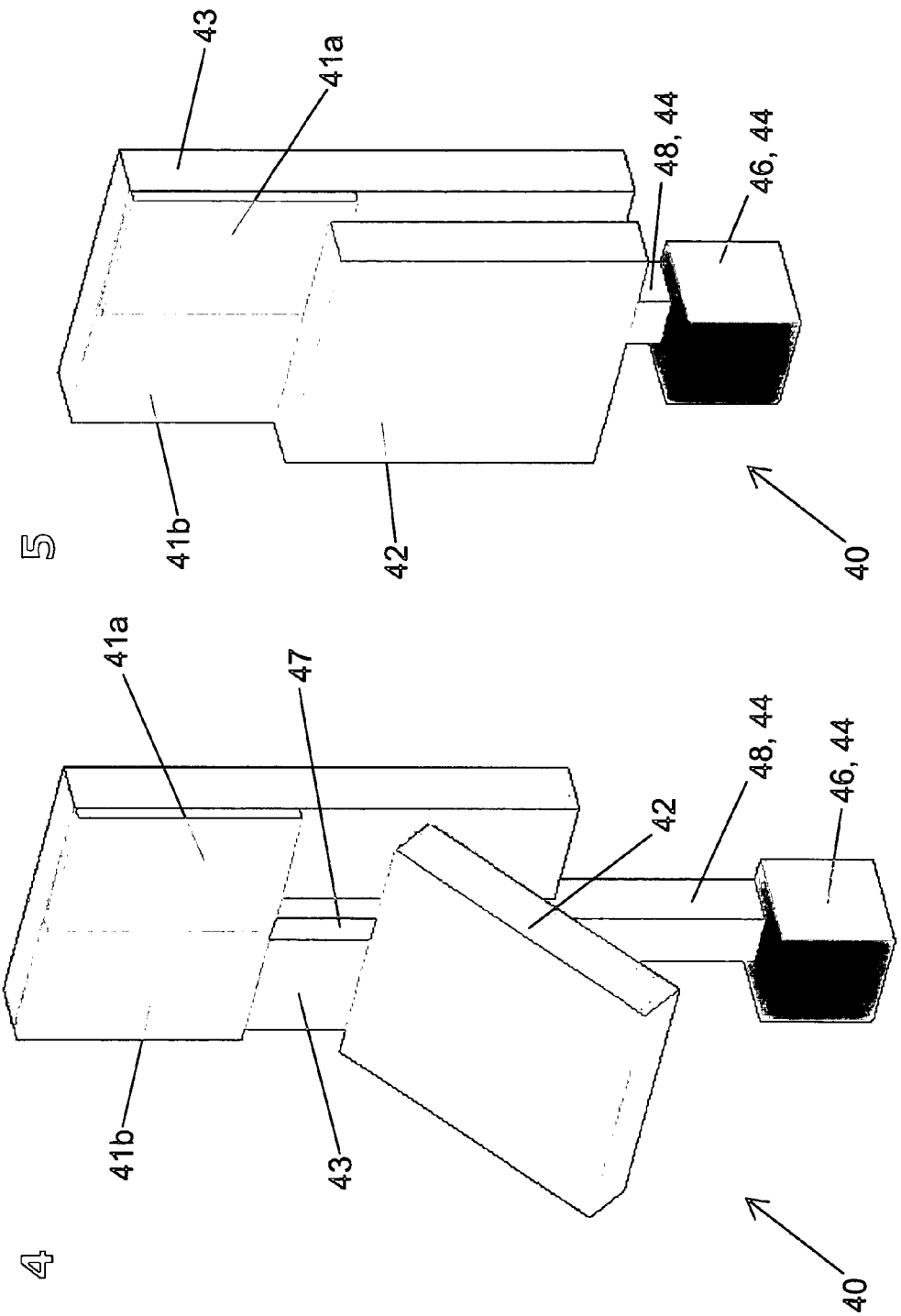

INTER-SHIP PERSONNEL TRANSFER DEVICE AND METHOD OF MOVING BETWEEN COMPACTED STATE AND NON-COMPACTED STATE

CROSS-REFERENCE TO RELATED APPLICATIONS

This application claims the benefit of U.S. provisional application No. 60/797,083, filing date 22 Apr. 2006, hereby incorporated herein by reference, entitled "Inter-Ship Personnel Transfer Device," joint inventors Sean M. Gallagher, Stuart G. Ullman, Ryan T. Hayleck, Christopher J. Doyle, John F. O'Dea, Robert W. Anderson, and Kellie L. Redcay.

This application claims the benefit of U.S. provisional application No. 60/797,085, filing date 21 Apr. 2006, hereby incorporated herein by reference, entitled "Cargo Transfer Method and Apparatus," joint inventors Robert W. Anderson, Stuart G. Ullman, Kellie L. Redcay, Ryan T. Hayleck, John F. O'Dea, Sean M. Gallagher, Christopher J. Doyle, and Donald R. Jacobson.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to transportation of people, more particularly to methods and devices for transferring people between marine vessels (e.g., ships or boats) and/or other marine structures (e.g., offshore platforms) while at sea.

With the United States Navy's introduction of the Sea Base program and of concepts such as Ship-to-Objective-Maneuver, there is a greater need for personnel to be transferred between marine structures (e.g., marine vessels such as ships) while at sea. Unfortunately, such transfer is often quite difficult to achieve because of high sea states and other environmental constraints and influences. Among the various methodologies proposed to address this problem, many have involved ramps, slides, or ladders. Generally speaking, previous concepts have proven to be less than entirely satisfactory due to the varying relative motion between the marine structures.

Of interest are the following United States patents, each of which is incorporated herein by reference: Greene, Jr. U.S. Pat. No. 6,309,160 B1 issued 30 Oct. 2001 entitled "Offshore Personnel Transfer System"; Bernal U.S. Pat. No. 6,131,224 issued 17 Oct. 2000 entitled "Coupling Device for Transfer between a Static Structure and a Dynamic Structure"; Wehmeyer U.S. Pat. No. 5,203,425 issued 20 Apr. 1993 entitled "Personnel Lift Devices"; Hill U.S. Pat. No. 5,160,286 issued 3 Nov. 1992 entitled "Personnel Transfer System"; Kimon et al. U.S. Pat. No. 4,412,598 issued 1 Nov. 1983 entitled "Personnel Transfer Apparatus and Method."

Hill U.S. Pat. No. 5,160,286, afore-noted, discloses personnel transfer apparatus that can be used as a buoyant support for persons in water as well as for transferring persons between marine vessels. Hill is largely concerned with floatability of his apparatus. According to his preferred embodiments, Hill provides a buoyant, shock-absorbing base supporting the deck of his cylindrical chamber, and further provides for his chamber plural peripheral posts (usable for lifting purposes) and a central post (not usable for lifting purposes) that can include foam material for enhancing floatability and padding for protecting the occupants. Hill provides embodiments of his apparatus "of the sitting type" (which includes a central bench, or two central benches with a safety belt for each) and "of the standing type." Among the drawbacks of Hill's apparatus are its rather cumbersome nature, its inability to accommodate large numbers of occupants, and its inability to protect the occupants from shaking, jolting and jostling that may accompany hoisting of his apparatus.

SUMMARY OF THE INVENTION

In view of the foregoing, it is an object of the present invention to provide method and apparatus for safely transferring personnel between marine structures in a marine (e.g., waterborne or at-sea) setting.

Another object of the present invention is to provide such method and apparatus that can safely transfer large numbers of personnel.

A further object of the present invention is to provide such apparatus that does not take up an inordinate amount of space when not in use.

The present invention represents a new methodology for transferring people between ships while at sea. The present invention goes in a different direction from most previous approaches to transferring personnel between marine vessels. In creating its unique personnel solution, the present invention draws from the shipping industry's extensive experience of moving ISO (International Organization for Standardization) shipping containers. The present invention's personnel transfer device, as typically embodied, bears some similarity to an ISO container that contains stores; however, as distinguished from an ISO container for moving cargo, the inventive device is designed and optimized for moving personnel.

The inventive personnel transfer device is a human transportation vehicle that enables the rapid and safe transfer of large numbers of people between ships in situations in which other methodologies of transit are not feasible. The present invention is safe, affords flexible usage, can be used with existing assets, is relatively uncomplicated, and has a small stowage footprint. As the present invention is frequently practiced, multiple people are transferred between ships at sea. According to typical embodiments, the inventive methodology uses existing assets, such as cranes (e.g., gantry crane or boom crane) or vertical replenishment ("VERTREP") tools (e.g., helicopters), for hoisting the inventive vehicle from a first location (e.g., a first ship's deck) to a second location (e.g., a second ship's deck).

In accordance with typical embodiments of the present invention, a compactable transport device for containing personnel and being hoisted between locations comprises a foldable frame, at least one foldable chair, and a shock-absorbent base. The frame includes a rigid floor, a rigid ceiling, and four foldable posts. Each chair is mounted on the floor. The shock-absorbent base adjoins the frame beneath the floor. The shock-absorbent base is, for instance, a solid member composed of a high-damping elastomeric material characterized by a coefficient of restitution of less than approximately 0.1 (relative to the surface of a stationary object made of steel such as a typical ship deck), or an inflated sealed bladder, or an inflated unsealed bladder that deflates upon impact and that self-inflates subsequent to said deflation. Each post includes two post sections of approximately equal length, and has two post ends and a junction between the two post sections so that each post section has a post end and so that the two post sections are hingedly connected to each other at the junction. The ceiling has four ceiling corners; the floor has four floor corners. Each post is hingedly connected at a first post end to the ceiling at a ceiling corner, and is hingedly connected at a second post end to the floor at a floor corner. Each chair includes a seat, a chair back, a pair of lateral head restraints, and a chair support. Each restraint is hingedly connected to the chair back. The seat is hingedly connected to the chair support. The chair support is hingedly connected to the floor.

As the present invention's compactable transport device is typically embodied, the frame approximately describes a first rectangular prismatic geometric shape when the frame is in a completely unfolded state. The frame approximately describes a second rectangular prismatic geometric shape when the frame is in a completely folded state. The second rectangular prismatic geometric shape is squatter than the first rectangular prismatic geometric shape. The first rectangular prismatic geometric shape has four vertical edges. Regardless of whether the frame is in a completely unfolded state or a completely folded state, the ceiling and the floor approximately lie in respective geometric planes that are approximately parallel with respect to each other. When the frame is in a completely unfolded state, the post sections of each said post are approximately coaxial (the post thus being in a completely unfolded state), the posts approximately corresponding to the four vertical edges of the first rectangular prismatic geometric shape. When the frame is in a completely folded state, the ceiling, the floor, the post sections, the seat, the chair back, the lateral head restraints, and the chair support approximately lie in respective geometric planes that are approximately parallel with respect to each other.

A typical inventive method for transporting personnel between locations comprises: (a) adjusting an inventive compactable transport device from a completely compacted state to a completely non-compacted state, the adjusting including (i) unfolding a frame from a completely folded state to a completely unfolded state, and (ii) unfolding each chair from a completely folded state to a completely unfolded state; (b) at a first location, embarking at least one passenger on the inventive device in a completely non-compacted state, the embarking including situating the at least one passenger in the at least one chair, each passenger being situated in one chair; (c) hoisting the inventive device, in a completely non-compacted state with the at least one passenger embarked thereon, from the first location to a second location; (d) at the second location, disembarking the at least one passenger from the device in a completely non-compacted state; and, (e) subsequent to the disembarking of the at least one passenger, adjusting the device from a completely non-compacted state to a completely compacted state, the adjusting including (i) folding the frame from a completely folded state to a completely unfolded state, and (ii) folding each chair from a completely unfolded state to a completely folded state. According to typical inventive practice, the hoisting of the inventive device includes, prior to the disembarking of the at least one passenger, placing the device in a completely non-compacted state upon a surface at the second location so that the shock-absorbent base contacts the surface but neither the frame nor the at least one chair contacts the surface.

As the present invention is frequently practiced, the folding of the frame includes folding each post from a completely unfolded state to a completely folded state. The folding of each said post includes rotating a first post section toward the ceiling, rotating a second post section toward the floor, and rotating the post sections toward each other. The folding of each chair includes rotating each lateral head restraint toward said chair back, rotating the seat toward the chair back and/or the chair support, and rotating the chair support toward the floor. The unfolding of the frame includes unfolding each post from a completely folded state to a completely unfolded state. The unfolding of each post includes rotating a first post section away from the ceiling, rotating a second post section away from the floor, and rotating the post sections away from each other. The unfolding of each chair includes rotating each lateral head restraint away from the chair back, rotating the seat away from the chair back and/or the chair support, and rotating the chair support away from the floor.

The inventive personnel transfer device embodiment being considered for U.S. Navy use, dubbed the "Gator Crate" by the present inventors, carries eighteen passengers in a twenty-foot frame that comports with ISO dimensional standards. In furtherance of the safety of the occupants, the base beneath the floor of the inventive personnel transfer device's frame (for containing the passengers) absorbs impact loads. The inventive personnel transfer device's frame, as well as the chairs contained therein, fold for compact stowage of the inventive personnel transfer device.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein like numbers indicate the same or similar components, and wherein:

FIG. 3 is a perspective view of transfer via boom crane of an inventive personnel transfer device such as that shown in FIG. 1.

FIG. 4 is a perspective view of transfer via helicopter of an inventive personnel transfer device such as that shown in FIG. 1.

FIG. 15 through FIG. 17 are top plan views of the inventive chair embodiment (in particular, the lefthand chair) shown in FIG. 8 through FIG. 14. One inventive chair is shown in FIG. 15 through FIG. 17, which correspond to FIG. 8 through FIG. 10 with respect to the folding of the side head restraints. FIG. 15 through FIG. 17 illustrate, in a top plan view, the folding in of the side head restraints from being completely unfolded (FIG. 15; FIG. 8) to completely folded (FIG. 17; FIG. 10).

FIG. 18 through FIG. 24 are CAD-based diagrams of an inventive chair embodiment identical or similar to that shown in FIG. 8 through FIG. 17. The inventive chair is shown in FIG. 18, in a perspective view, in a completely unfolded state. The inventive chair is shown in FIG. 19 through FIG. 24, in the same perspective view, in an increasingly/progressively folded state, with complete folding down of the inventive chair being shown in FIG. 24.

DETAILED DESCRIPTION OF THE PRESENT INVENTION

Figure 1:
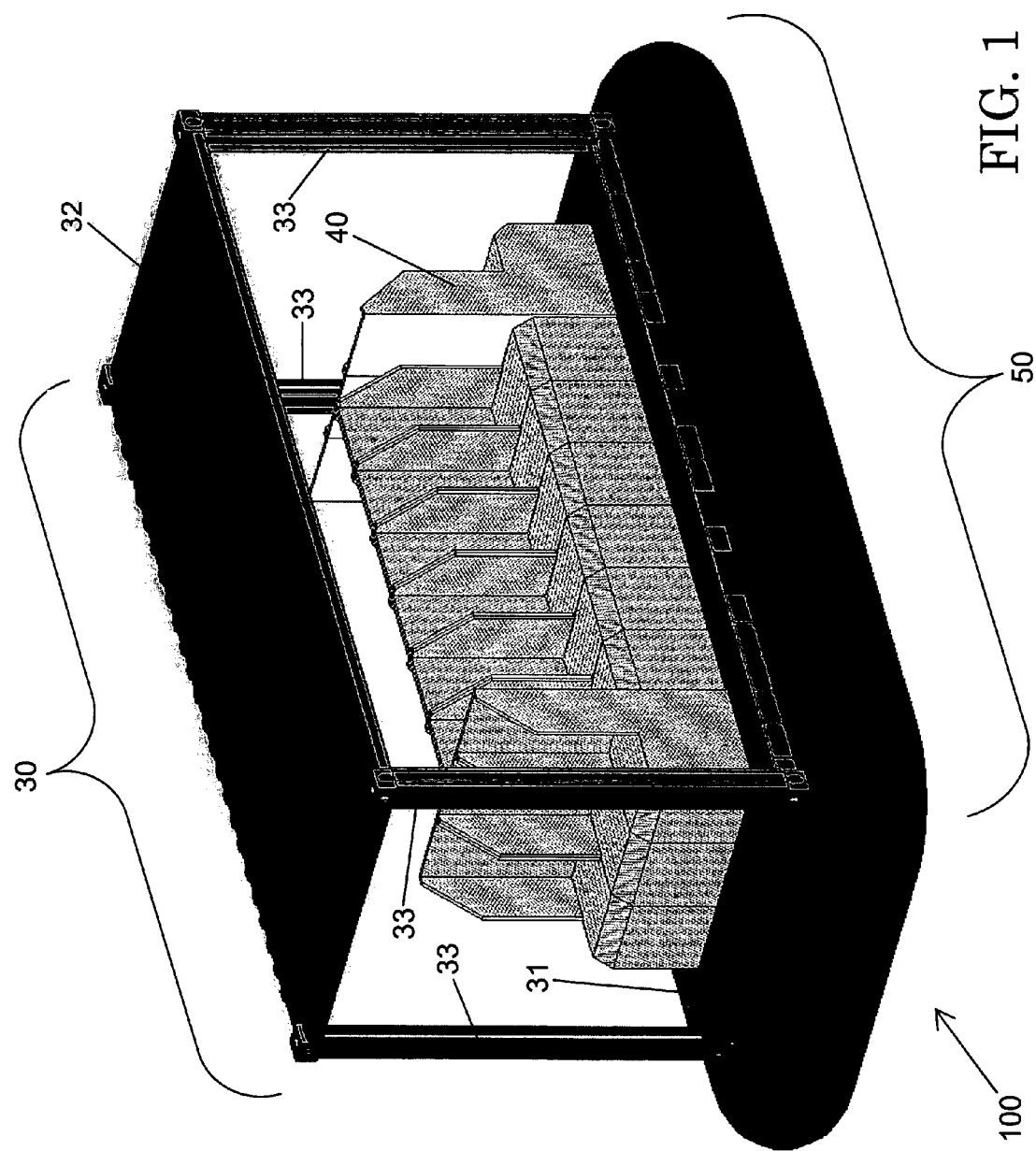
FIG. 1 is a perspective view of an embodiment, being considered for use by the U.S. Navy, of a personnel transfer device in accordance with the present invention.

Referring now to FIG. 1, the present invention's compactable transport device 100 is shown to be in a completely unfolded state, suitable for human transport. The inventive device 100 illustrated in FIG. 1 is generally representative of an inventive embodiment being contemplated for use in the near future by the U.S. Navy. Inventive device 100 includes foldable frame 30, eighteen foldable chairs 40, and a shock-absorbent base 50. Frame 30 includes a rigid floor panel 31, a rigid ceiling panel 32, and four foldable posts 33. Floor panel 31, ceiling panel 32 and posts 33 are each composed of a rigid material such as metal (elemental or alloy), wood, or composite. For instance, floor panel 31 and ceiling panel 32 can each essentially consist of a plate made of steel or other suitable metallic material. Floor panel 31 and ceiling panel 32 are parallel and congruent, each describing the same flat rectangular shape. Each chair 40 is attached to floor panel 31 at the top surface of floor panel 31. Shock-absorbent base 50 is attached to floor panel 31 at the bottom surface of floor panel 31. The completely unfolded inventive device 100 shown in FIG. 1 has a completely unfolded frame 30 and completely unfolded chairs 40.

Figure 2:
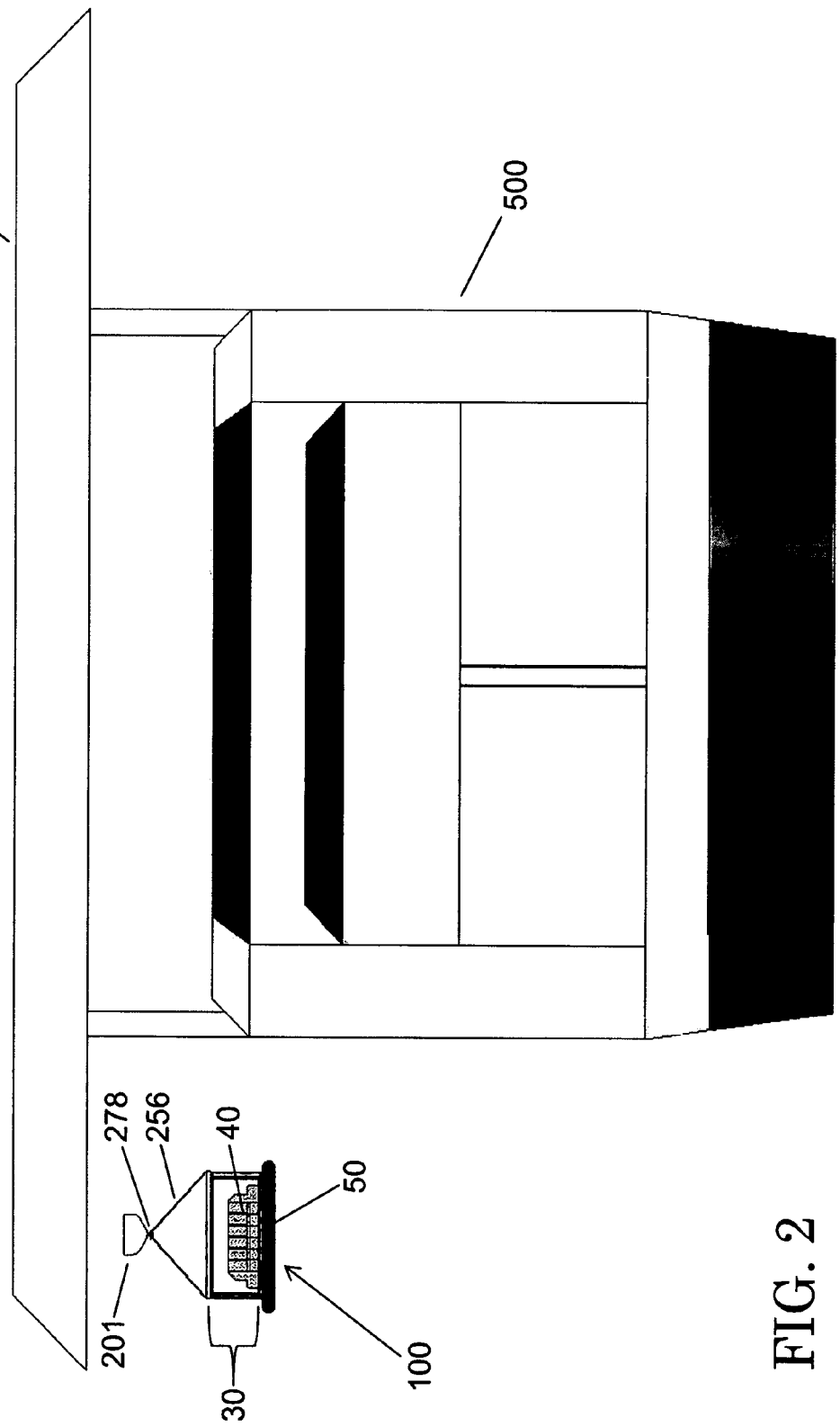
FIG. 2 is a perspective view of transfer via gantry crane of an inventive personnel transfer device such as that shown in FIG. 1.
Figure 5:
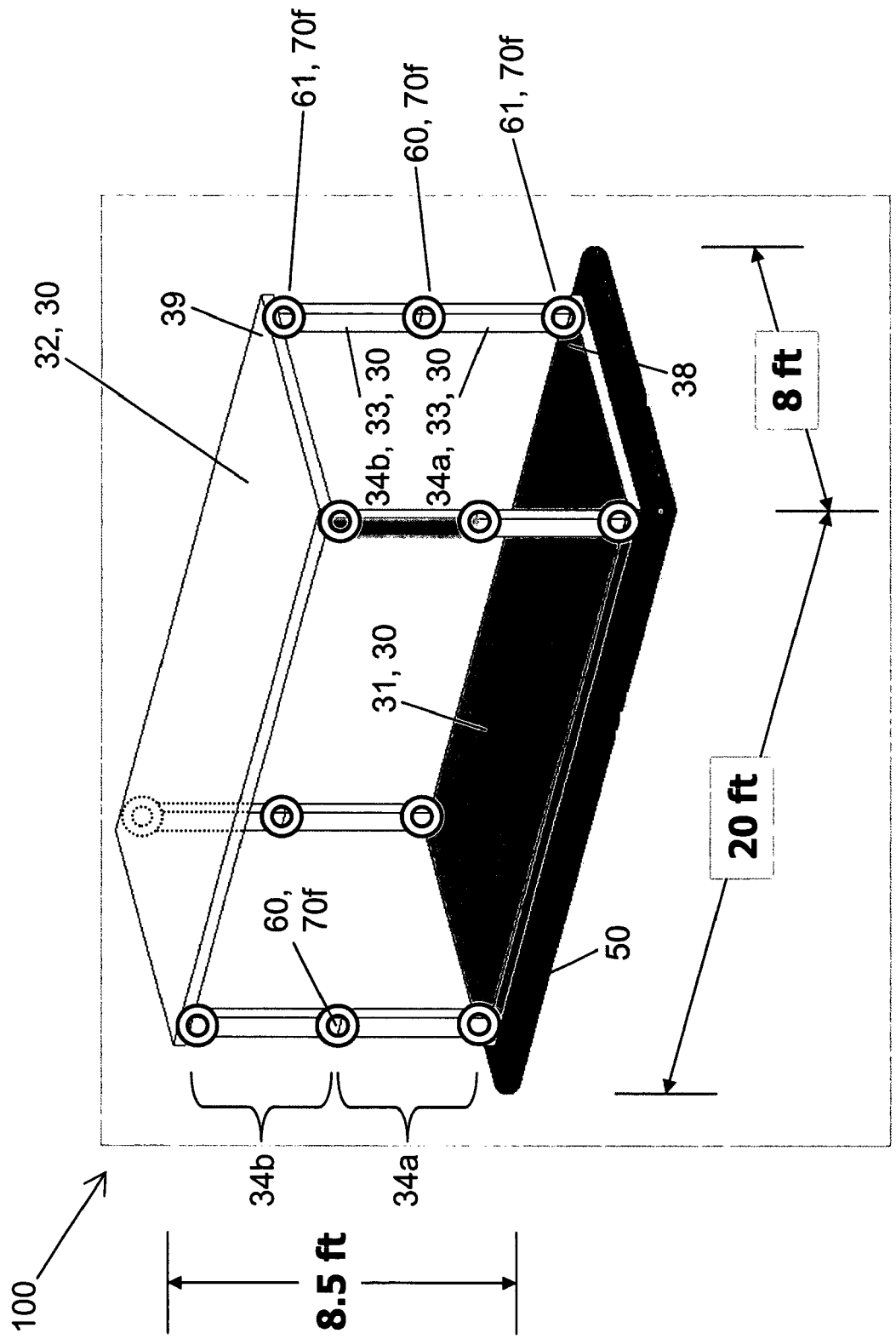
FIG. 5 through FIG. 7 are perspective views of an embodiment of an inventive frame such as may be implemented as the inventive frame of the inventive personnel transfer device shown in FIG. 1. The frame is shown in FIG. 5 in a completely unfolded state, in FIG. 6 in a partially folded state, and in FIG. 7 in a completely folded state.

The designed (but not yet constructed) U.S. Navy prototypical embodiment of an inventive personnel transfer device 100 includes eighteen chairs 40 and a frame 30 which, when completely unfolded, has a rectangular prism shape and dimensions comporting with ISO standards. As shown in FIG. 1, the frame 30 and the chairs 40 are in completely unfolded states. The U.S. Navy's device 100 prototype, depicted in FIG. 1, includes a frame 30 that has dimensions 20 feet in length, 8 feet in width, and 8.5 feet in height. Once the prototypical inventive device 100 is employed, up to eighteen people will be able to gather and sit inside the inventive device 100's frame 30, contained therein, for transit between two points. The shape and weight of the prototypical inventive device 100's volume is such that it can be used with traditional lifting devices such as cranes (such as shown in FIG. 2 and FIG. 3) or helicopters (such as shown in FIG. 4). As indicated in FIG. 5, the prototypical inventive device 100 has a frame 30 that is dimensionally based on the volume of a 20 ft length×8 ft width×8.5 ft height ISO container. These standard ISO dimensions were selected since this represents a relatively large volume that already has plenty of lifting technology associated with it. This volume can accommodate (fit) up to eighteen military people (e.g., U.S. Marines) in full combat gear, including their packs, each in an individual seat.

Although frame 30 is shown in FIG. 1 and other figures herein to describe a rectangular prismatic shape, the present invention can be practiced whereby frame 30 describes any of multifarious three-dimensional shapes. Further, although inventive practice is possible involving one or practically any plural number of chairs 40, inventive practice frequently provides for a large number of chairs 40 (such as the eighteen chairs 40 shown in FIG. 1) to accommodate large numbers of occupants. The chairs 40 are shown in FIG. 1 to be contiguously arrayed in a centralized rectangular bench-like configuration that roughly comports with the matching rectangular geometric forms of floor panel 31 and ceiling panel 32. The chairs constitute four bench-like formations closely arranged so as to describe a rectangular shape smaller than but similar to the rectangular shape identically described by floor panel 31 and ceiling panel 32; two opposite-facing lengthwise benches consist of six chairs 40 each, and two opposite-facing widthwise benches consist of three chairs each.

With reference to FIG. 2 through FIG. 4, inventive device 100 is typically used as a transportation vehicle for being hoisted (e.g., by a crane or an aircraft) from a first location to a second location while carrying one or (more typically) plural passengers. As illustrated in FIG. 2, a gantry crane 200, situated on a marine vessel 500 (such as the U.S. Navy's planned "Sea Beast," designed to sit between two other marine vessels to facilitate inter-ship transfer), implements a horizontally moveable trolley 201 from which inventive device 100 is suspended via a hoist line 234. As illustrated in FIG. 3, a slewing pedestal crane 300 (also commonly referred to as a "rotary boom crane" or a "rotary jib crane") suspends inventive device 100 via a hoist line 234 from the tip of a rotatable boom (jib) 301. As illustrated in FIG. 4, inventive device 100 is suspended via a hoist line 234 from a helicopter 400.

In the light of the instant disclosure, the ordinarily skilled artisan will appreciate the various joint means 256 for joining an inventive device 100 with a hoist line 234 in order to hoist inventive device 100. In particular, known techniques for associating conventional ISO containers with hoist lines are applicable to inventive practice. For instance, one or more standard ISO-container spreader bars 256 or box spreaders 256, diagrammatically represented in FIG. 2 through FIG. 4, can be implemented for connecting hoist line 234 to frame 30. Alternatively, four relatively short hoist-coupling lines 256 can each be attached to ceiling panel 32 and/or a post 33 at a corner 39 of the ceiling panel 32 at its upper surface. The four lines 256 converge and meet at an attachment point 278 at the lower end of hoist line 234 so as to engage, e.g., a hook block (not shown) at the host line 234's lower end.

Regardless of the hoisting technique (e.g., crane or aircraft), the typical inventive methodology for transporting personnel between locations includes embarking the passenger(s) onto inventive device 100 at a first location, hoisting inventive device 100 with the passengers seated therein, and disembarking the passenger(s) from inventive device 100 at a second location. For the embarking, inventive device 100 is situated on a surface 401 such as a ship deck; similarly, for the disembarking, inventive device 100 is situated on a surface 401 such as a ship deck. The embarking includes seating the passenger(s) in the chair(s) 40, one passenger to a chair 40. The disembarking includes unseating the passenger(s) from the chair(s) 40. The hoist landing of an inventive device 100 at any location should be deliberately accomplished, as gently as possible, so that the shock-absorbent base 50 abuttingly makes contact with the landing surface 401 at a relatively low speed so as to be optimally effective in dissipating energy associated with the impact of the inventive device 100 upon the landing surface 401. The take-off and landing surfaces 401 are typically surfaces of solid structures.

Although inventive device 100 can be embodied so as to provide for its buoyancy to permit its situation in water at the water surface, this is generally not preferred inventive practice. To provide for buoyancy, the inventive device 100 would likely include an inflatable base 50c of the kind shown in FIG. 27. A buoyant inventive device 100 would require careful design (such as incorporating additional, ballast-type structure) to ensure the safety of the passengers, as an extremely high (perhaps certain) risk of capsizing is associated with a relatively high center of gravity characterizing inventive device 100 as typically embodied. Moreover, a typical non-buoyant inventive device 100, such as depicted in FIG. 1, FIG. 5 through FIG. 7, and FIG. 25, has a base 50 having length and width dimensions that are concordant (e.g., nearly coextensive) with those of the frame 30; as depicted, base 50 only slightly/somewhat exceeds frame 30 in length and width, thus advancing the foldability and storability of the overall inventive device 100. In contrast, a buoyant inventive device 100 would likely require a base 50 that extends well beyond frame 30 in length and width, thus compromising or vitiating the foldability and storability of the overall inventive device 100.

Figure 6:
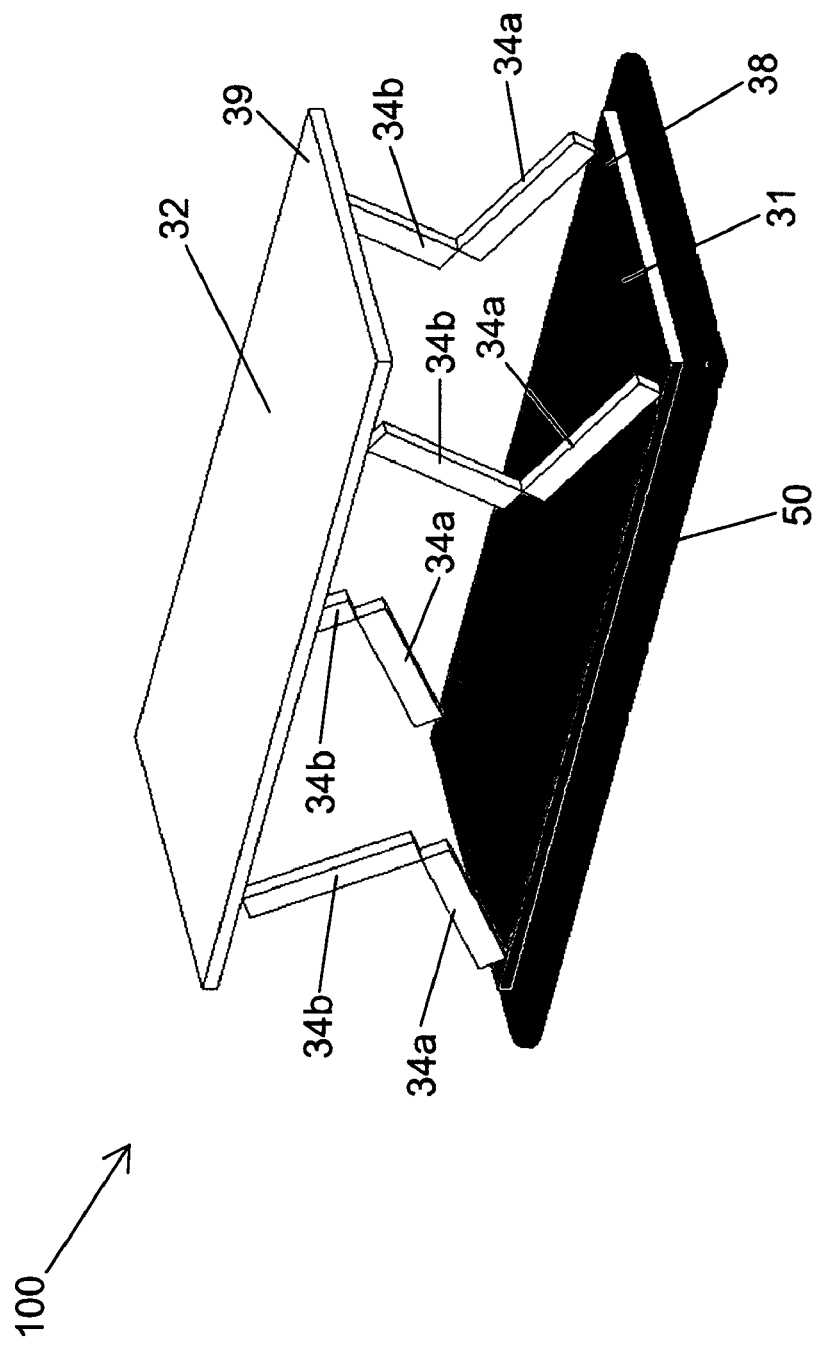
Figure 7:
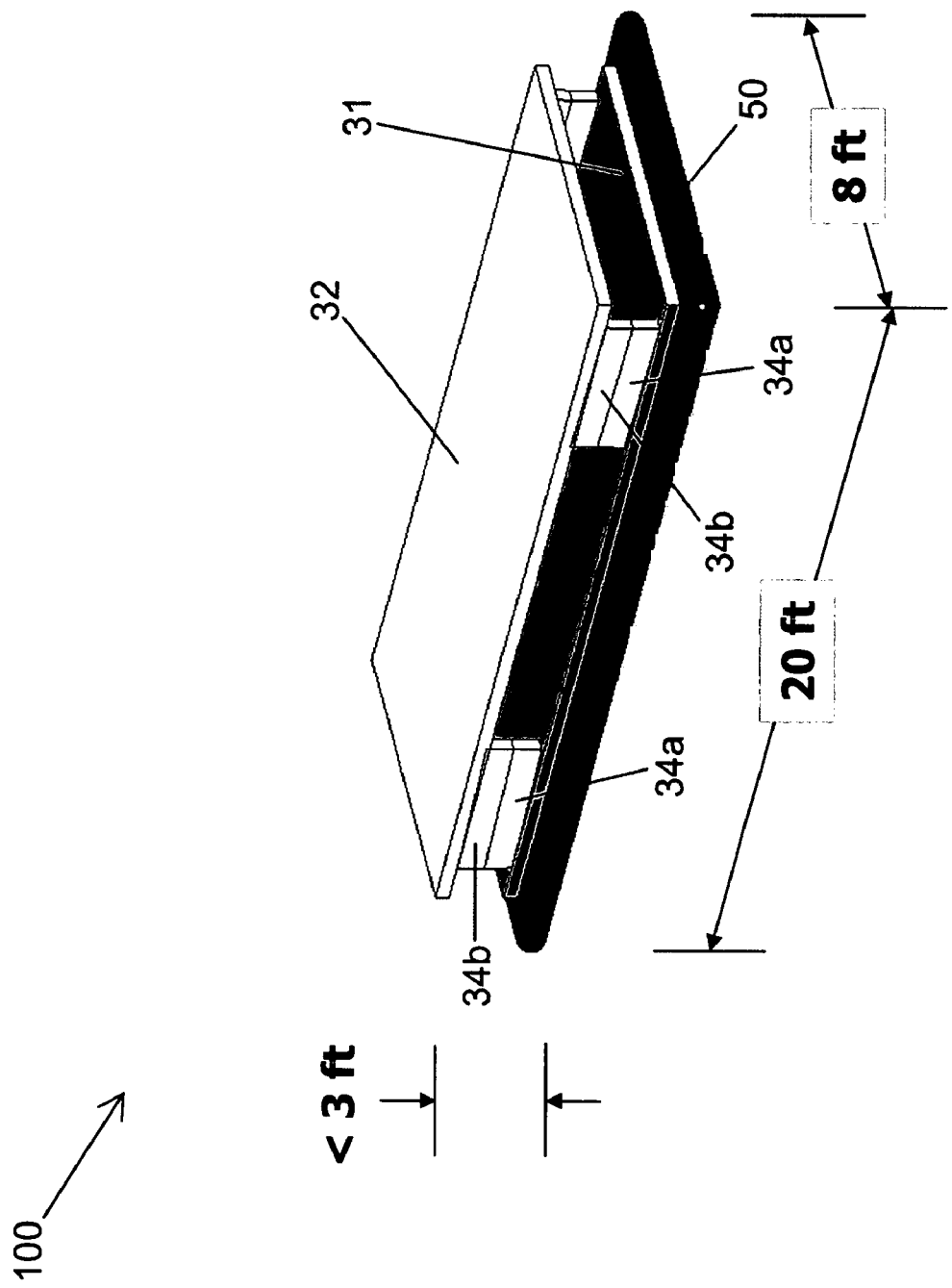

The posts 33 are the vertical straight structural members connecting the horizontal floor panel 31 and the horizontal ceiling panel 32 when frame 30 is completely unfolded. Reference now being made to FIG. 5 through FIG. 7, each post 33 includes two rigid post sections 34a and 34b of equal length. Each post 33 has a medial post inter-section junction 60 (where lower post section 34a and upper post section 34b meet), a lower post end 61 and an upper post end 62. Floor panel 31 has four floor corners 38, and ceiling panel 32 has four ceiling corners 39. As to each post 33: Lower post section 34a and upper post section 34b are connected to each other at their junction 60 via a frame hinge 70f, lower post section 34a is connected to floor panel 31 (at a floor corner 38) at its lower post end 61 via a frame hinge 70f; upper post section 34b is connected to ceiling panel 32 (at a ceiling corner 39) at its upper post end 62 via a frame hinge 70f. The term "hinge" as used herein broadly refers to any mechanical device that connects two objects and permits, facilitates or promotes a degree of rotation between the objects, such as rotation of one or either object relative to the other object.

Inventive frame 30 is in a completely unfolded state as shown in FIG. 1 through FIG. 5, is in a partially folded/unfolded state as shown in FIG. 6, and is in a completely folded state as shown in FIG. 7. Frame 30 when in a completely unfolded state (FIG. 5) describes a rectangular prismatic geometric shape having the same length and width of the rectangular prismatic geometric shape described by frame 30 when in a completely folded state (FIG. 7), except that the completely folded frame 30 has a significantly shorter height than has the completely unfolded frame. As shown in FIG. 5 through FIG. 7, the height of the completely folded frame 30 is less than ⅜ the height of the completely unfolded frame 30. According to most embodiments of the present invention, the completely folded frame is less than half the height of the completely unfolded frame.

According to frequent inventive practice, the folding and unfolding operations of frame 30, somewhat akin to the folding and unfolding of a conventional card or picnic table, are performed with the assistance of machinery such as a crane or forklift. According to some inventive embodiments, such as those including special pre-loaded hinges 70f, the folding and unfolding operations of frame 30 can be performed manually. Frame 30 shown in FIG. 5 is folded by bending each straight post 33 at its hinged medial junctions 60 and rotating its post sections 34a and 34b toward each other until post sections 34a and 34b are longitudinally adjacent as shown in FIG. 7. The unfolding of frame 30 from the completely folded state shown in FIG. 7 to the completely unfolded state shown in FIG. 5 involves the reverse process of rotating post sections 34a and 34b of each post 33 away from each other until each post 33's post sections 34a and 34b are coaxial as shown in FIG. 5.

According to typical inventive practice, the folding and unfolding operations of each chair 40, somewhat akin to the folding and unfolding of a conventional lounge or beach chair, are performed manually. With reference to FIG. 8 through FIG. 24, diverse embodiments of the present invention's chair 40 are possible, the common denominator being the capability of the chair of being folded down from a completely upright (i.e., useable) condition to a completely flat (i.e., storable) condition. The inventive chair 40 embodiment shown in FIG. 8 through FIG. 14 is characterized perhaps by a bit more mechanical complexity than is the inventive embodiment shown in FIG. 15 through FIG. 24. Either chair 40 embodiment includes two side (lateral) head restraints 41a and 41b, a chair seat 42, a chair back 43, and a chair support 44.

Reference is now made to FIG. 8 through FIG. 14, which show two equivalent chairs 40, viz., lefthand chair 40$_1$ and right-hand chair 40$_2$. As shown in FIG. 8 through FIG. 14, lefthand chair 40$_1$ includes two side head restraints 41$a_1$ and 41$a_2$ (right side head restraint 41$b_1$ is concealed behind left side head restraint 41$a_1$, as shown), chair seat 42$_1$, chair back 43$_1$, chair support column 48$_1$, two chair support struts 45$_1$, and a chair support pedestal 46$_1$; similarly, righthand chair 40$_2$ includes two side head restraints (left side head restraint 41$a_2$ is concealed behind right side head restraint 41$b_2$, as shown), chair seat 42$_2$, chair back 43$_2$, chair support column 48$_2$, two chair support struts 45$_2$, and a chair support pedestal 46$_2$. In lefthand chair 40$_1$, chair support 44$_1$ includes chair support column 48$_1$, chair support struts 45$_1$, and chair support pedestal 46$_1$; in righthand chair 40$_2$, chair support 44$_2$ includes chair support column 48$_2$, chair support struts 45$_2$, and chair support pedestal 46$_2$.

The folding down of the lefthand chair 40$_1$ shown in FIG. 8 through FIG. 14 involves folding of the various chair 40$_1$ components using the associated chair hinges 70c. It can be considered, with some approximation, that chair back 43$_1$ describes a vertical geometric plane, and that chair support column 48$_1$ lies in this vertical geometric plane. It can also be considered, with some approximation, that floor panel 31 describes a horizontal geometric plane. The support struts 45$_1$ are hingedly connected to each other (as are the support struts 45$_2$ of the righthand chair 40$_2$). Each of the two side head restraints 41a and 41b is rotated inward (toward the vertical geometric plane described by chair back 43$_1$); seat 42$_1$ is rotated downward (toward the vertical geometric plane described by chair back 43$_1$); chair back 43$_1$ is slid downward (toward the horizontal geometric plane described by floor panel 31) using a linear adjustment mechanism such as a slide-in-slot mechanism 47 (wherein either the left chair back portion 43a or the left chair support portion 44a is slotted); and, side head restraints 41a, and 41b1, chair seat 42$_1$, chair back 43$_1$, and chair support struts 45$_1$ are together rotated downward (toward the horizontal geometric plane described by floor panel 31).

Figure 8:
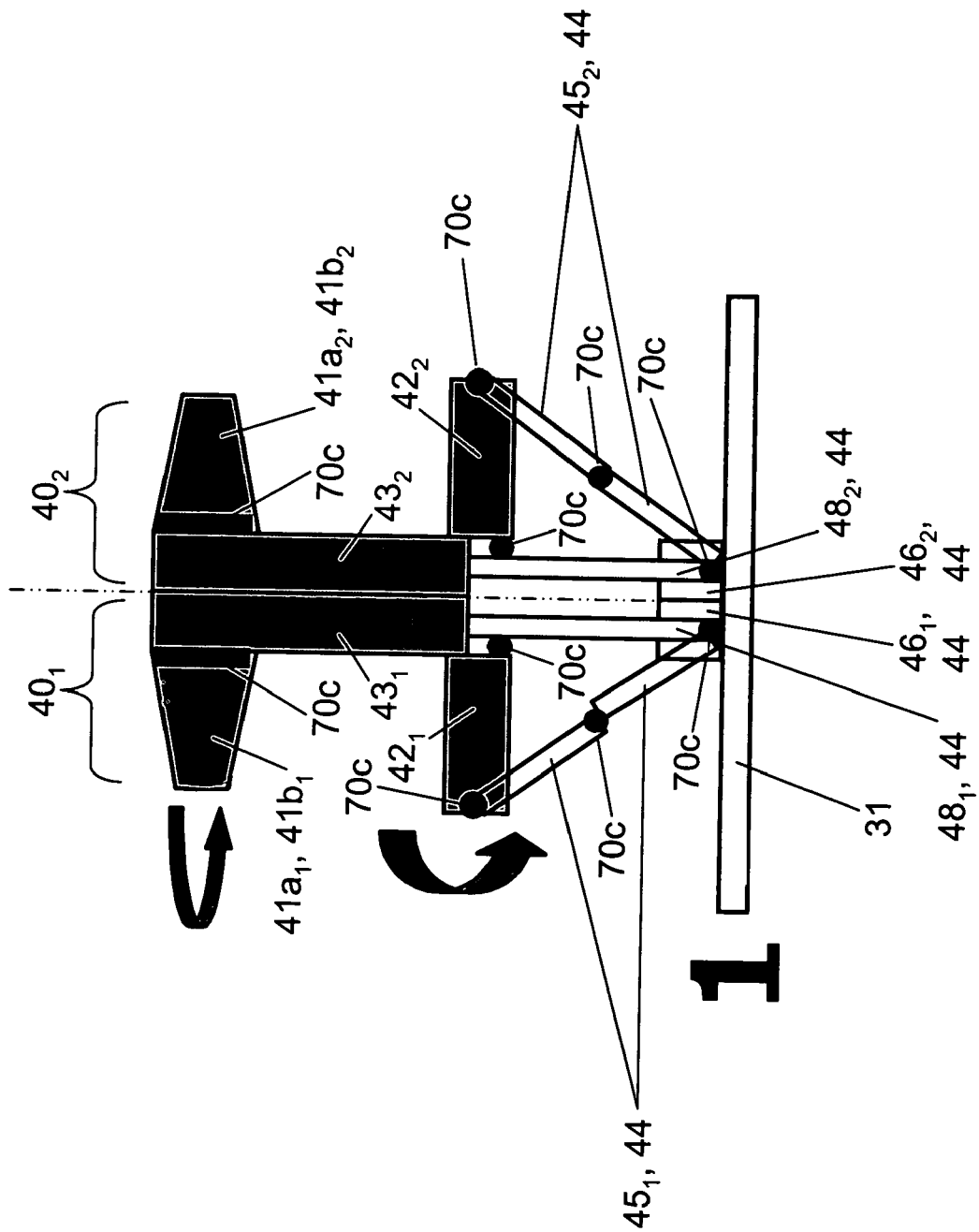
FIG. 8 through FIG. 14 are side elevation views of an embodiment of an inventive chair such as may be implemented as one of the eighteen inventive chair shown in FIG. 1. Each of FIG. 8 through FIG. 14 illustrates two counterpart inventive chairs (a lefthand chair and a righthand chair, as shown) that are back-to-back and facing opposite directions. Each inventive chair is shown in FIG. 8 in a completely unfolded state. The lefthand inventive chair is shown in FIG. 9 through FIG. 14 in an increasingly/progressively folded state, with complete folding down of the lefthand chair being shown in FIG. 14.
Figure 10:
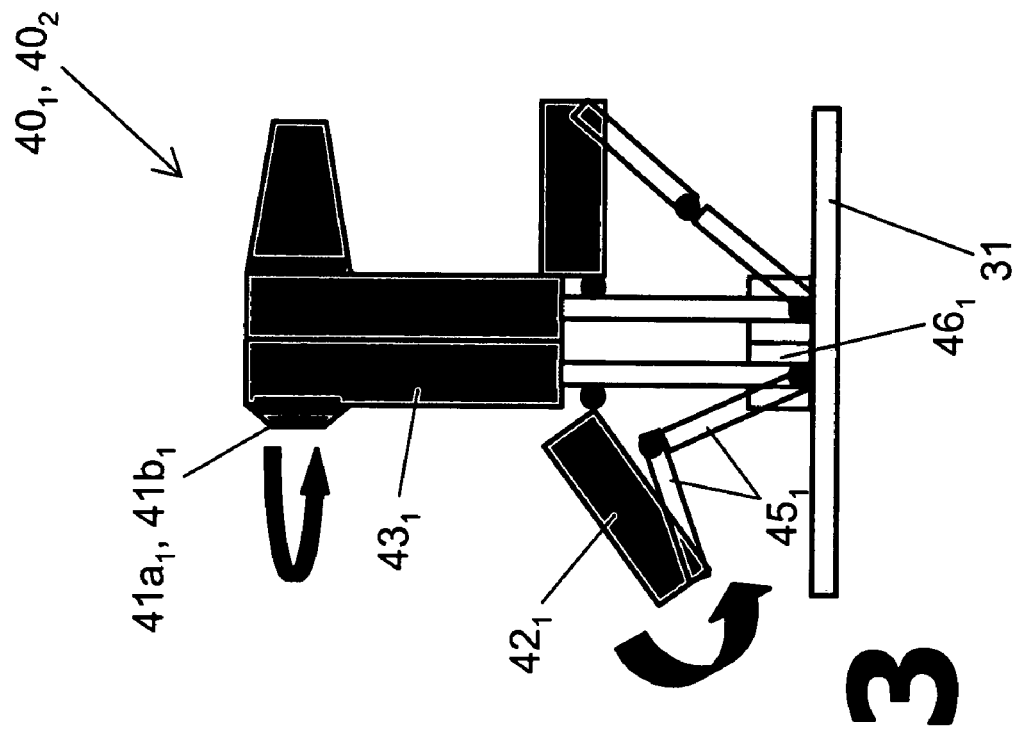
Figure 9:
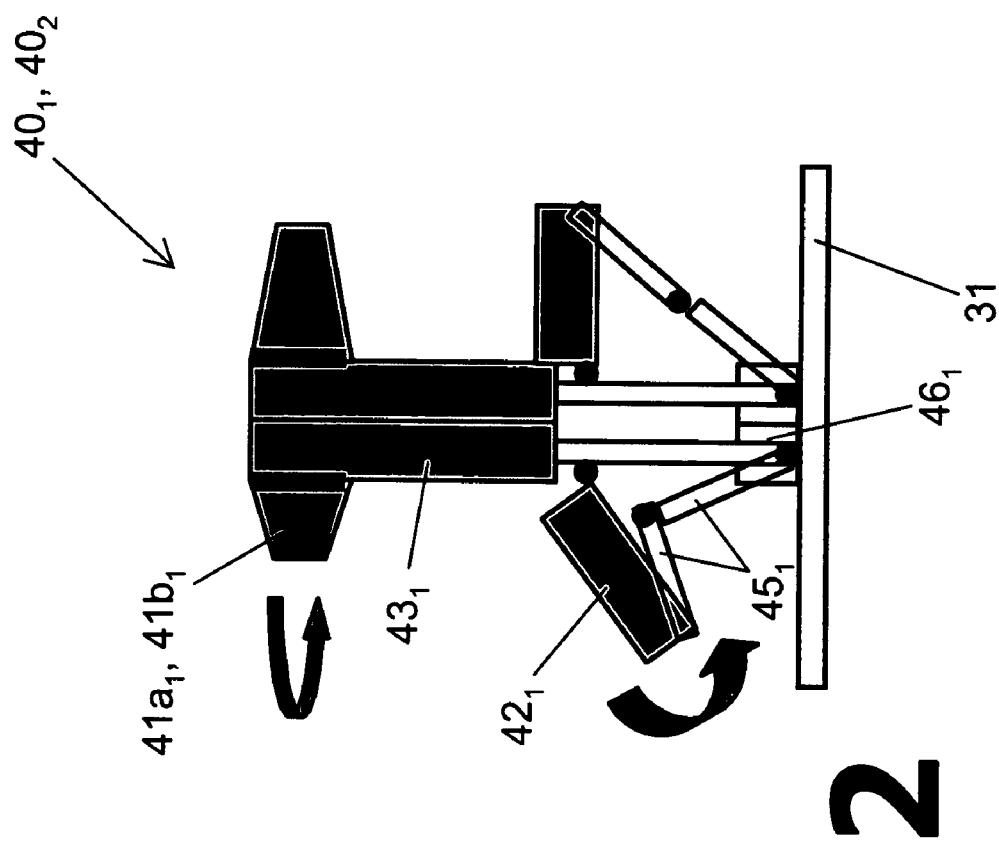
Figure 12:
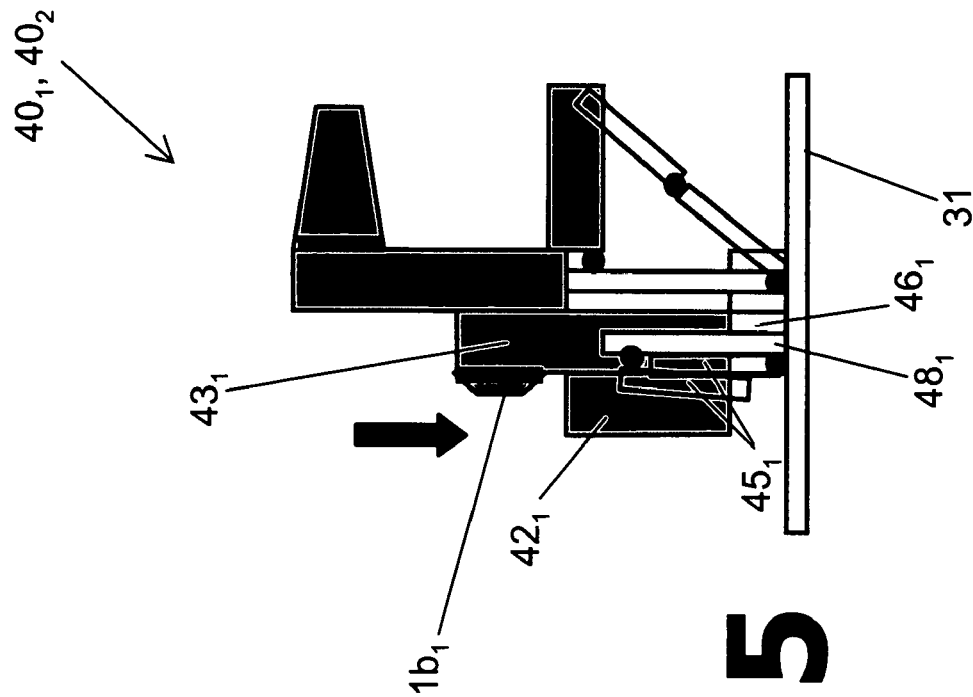
Figure 11:
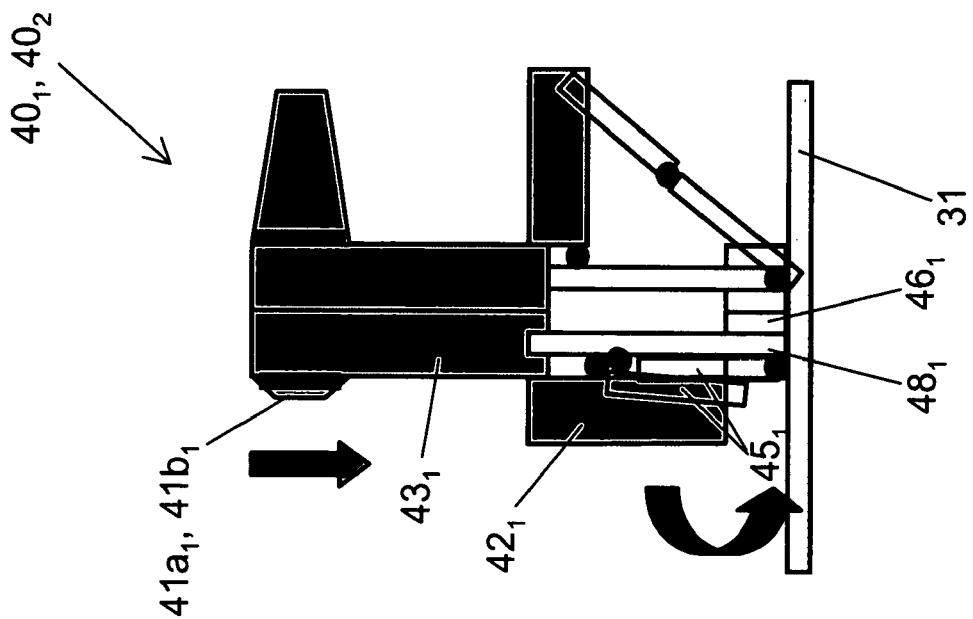
Figure 14:
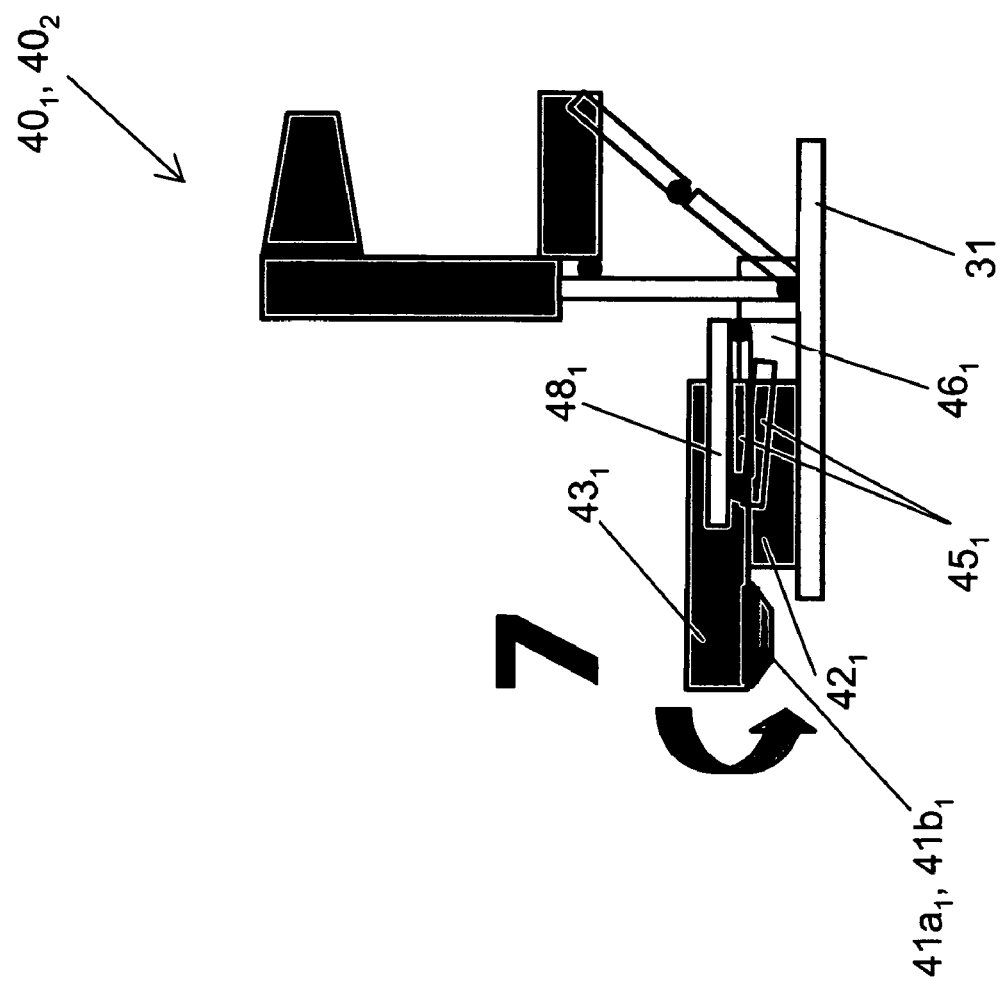
Figure 13:
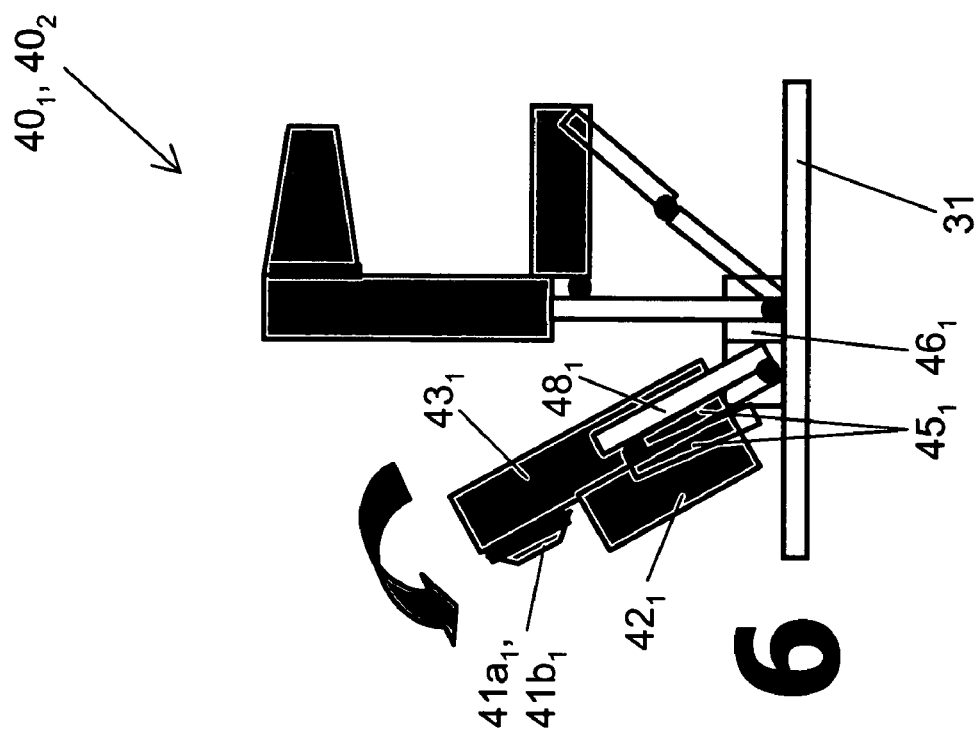

In its completely folded state, lefthand chair $40_1$ has a much shorter height than does righthand chair $40_2$, as shown in FIG. 14; equivalently stated, lefthand chair $40_1$ has a much shorter height than lefthand chair $40_1$ does in its completely unfolded state, as shown in FIG. 8. As shown in FIG. 14, chair back $43_1$, chair seat $42_1$, chair support column $48_1$, chair support struts $45_1$, and floor panel 31 are adjacently parallel (or approximately so) when in their respective horizontal positions. The unfolding of lefthand chair $40_1$ from the completely folded condition shown in FIG. 14 to the completely folded condition shown through FIG. 8 involves unfolding of the various chair $40_1$ components using the associated chair hinges 70c, doing so in a manner representing what is essentially a reversal of the approach to folding chair $40_1$ from the completely unfolded condition shown in FIG. 8 to the completely folded condition shown through FIG. 14. Folding and unfolding of righthand chair $40_2$ are performed in a similar manner.

Still referring to FIG. 8 through FIG. 14 and also referring to FIG. 15 through FIG. 24, a typical inventive chair 40 is endowed with safety features. The two side head restraints 41a and 41b are equivalently shaped, dimensioned and padded (e.g., with a resilient material). The seat 42 and chair back 43, as well, can be provided with padding in furtherance of the safety of the person sitting in the chair 40. Although the chairs 40 are diagrammatically represented herein as being characterized by rather simple rectilinear shapes, it is to be understood that the present invention's chairs 40 can be configured in precise and nuanced ways, such as having contours, to promote comfort and ergonomics. Strap-type restraint apparatus, such as seat belt 80 and shoulder harness 81 depicted in FIG. 15, is associated with each inventive chair 40 as typically practiced.

FIG. 15 through FIG. 17 are top plan views illustrative of the foldability of the side head restraints 41a and 41b of inventive chair embodiments such as shown in FIG. 8 through FIG. 24. In a basic conceptual sense, the embodiment shown in FIG. 15 through FIG. 17 is representative of many inventive chair 40 embodiments insofar as having a pair of foldable side head restraints 41a and 41b. The inventive chair is shown in FIG. 15 in a completely unfolded state, including the side head restraints 41a and 41b. FIG. 16 and FIG. 17 illustrate the folding in of the side head restraints 41a and 41b, with the chair 40 otherwise remaining unfolded. As depicted in FIG. 18 through FIG. 24, chair support 44 includes a chair support pedestal 46 and a chair support column 48. Each of the side head restraints 41a and 41b is hingedly connected to chair back 43. The chair seat 42 is hingedly connected to chair support column 48. The chair support 44 itself include a hinged mechanism whereby chair column 48 is hingedly connected to chair base 26, which is fastened to floor panel 31; hence, in effect, chair column 48 is hingedly connected to floor panel 31.

The folding down of the chair 40 embodiment shown in FIG. 18 through FIG. 24 involves folding of the various chair 40 components using the associated chair hinges 70c. As shown in FIG. 19 and FIG. 20, left side head restraint 41a and right side head restraint 41b are each rotated inward, toward the vertical geometric plane described by chair back 43, until adjacent and parallel to chair back 43. As shown in FIG. 21 and FIG. 22, seat 42 is rotated downward, toward the vertical geometric plane described by chair back 43, until adjacent and parallel to chair back 43. As further shown in FIG. 21 and FIG. 22, chair back 43 is moved downward, using a linear adjustment mechanism, toward the horizontal geometric plane described by floor 31. For instance, chair back 43 is slid downward using a slide-in-slot mechanism 48 in which the chair back 43 is provided with a slot to accommodate a sliding member with which support column 47 is provided; alternatively, chair support column 48 can be slotted to accommodate a sliding member with which chair back 43 is provided. Slide-in-slot mechanism 47 can be ratcheted for vertical adjustability of chair back 43 to conform with the seated individual. Other variations and types of linear adjustment mechanisms are possible for inventive chair 40.

Figure 18:
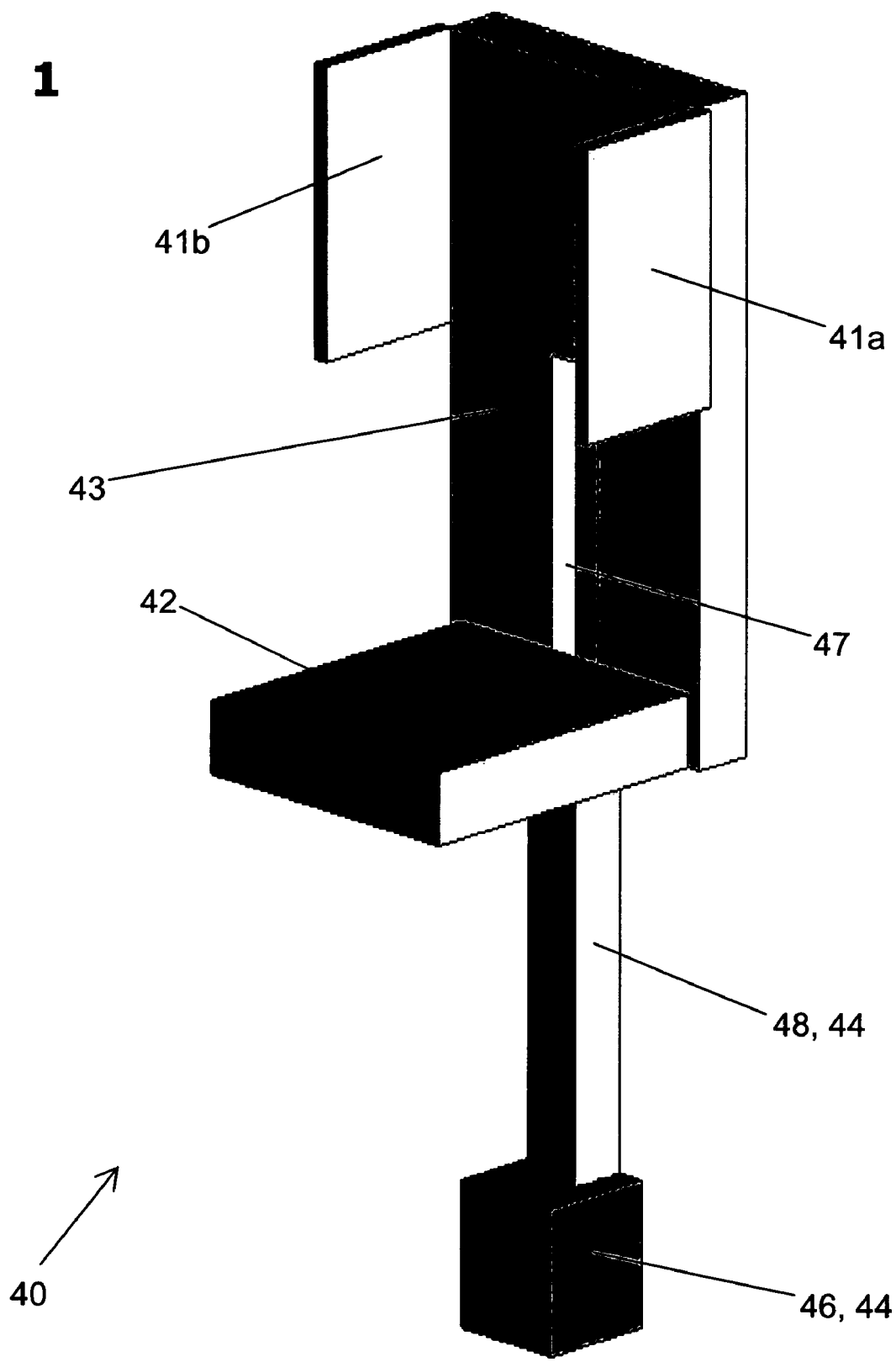
Figure 24:
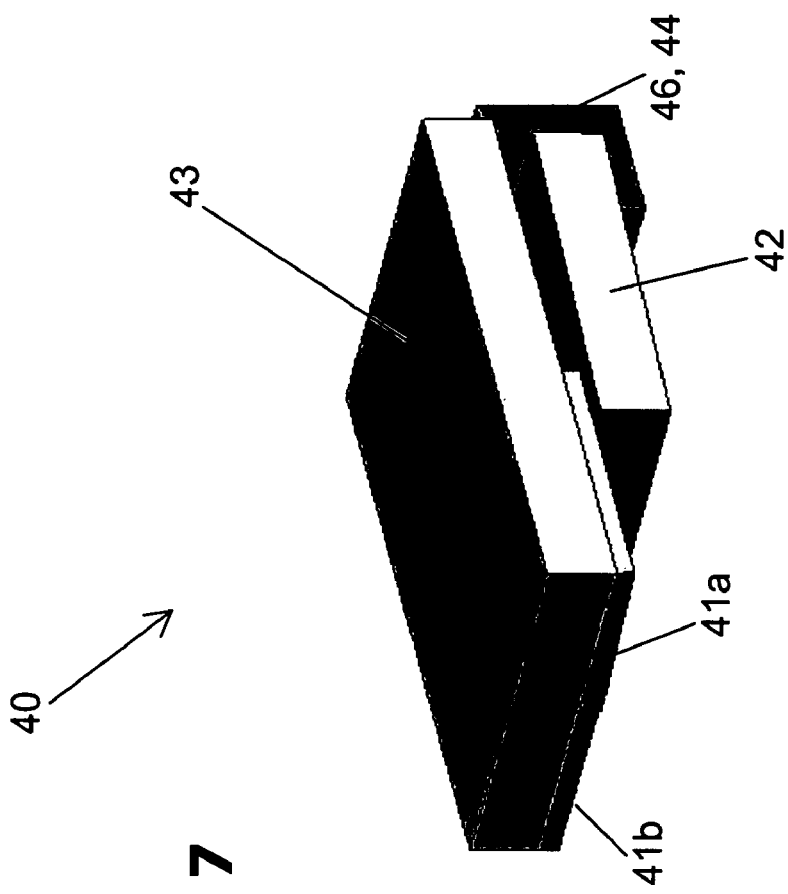
Figure 23:
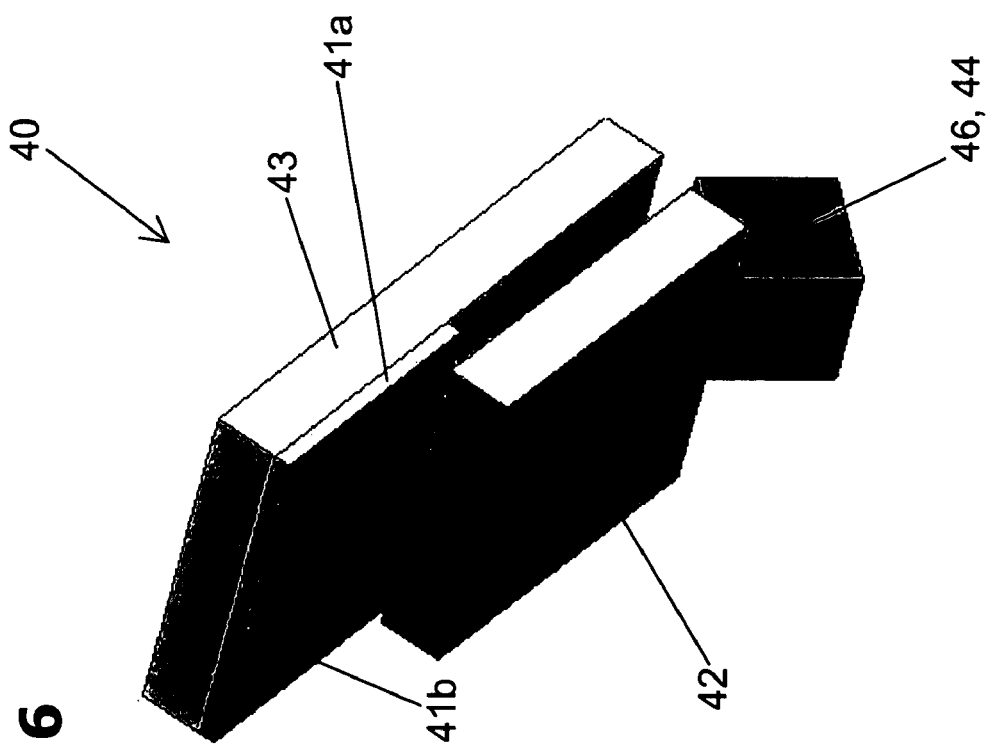

As shown in FIG. 23 and FIG. 24, side head restraints 41a and 41b, seat 42, chair back 43, and support column 48 are together rotated downward, toward the horizontal geometric plane described by floor panel 31. In its completely folded state (FIG. 24), inventive chair 40 is considerably squatter than it is in its completely unfolded state (FIG. 18). As shown in FIG. 24, chair back portion 43, seat 42, support column 48, and floor panel 31 are adjacently parallel when in their respective horizontal positions. The process of unfolding inventive chair 40 from completely folded (FIG. 24) to completely unfolded (FIG. 18) is essentially the reverse of the process of folding inventive chair 40 from completely unfolded (FIG. 18) to completely folded (FIG. 24).

Figure 25:
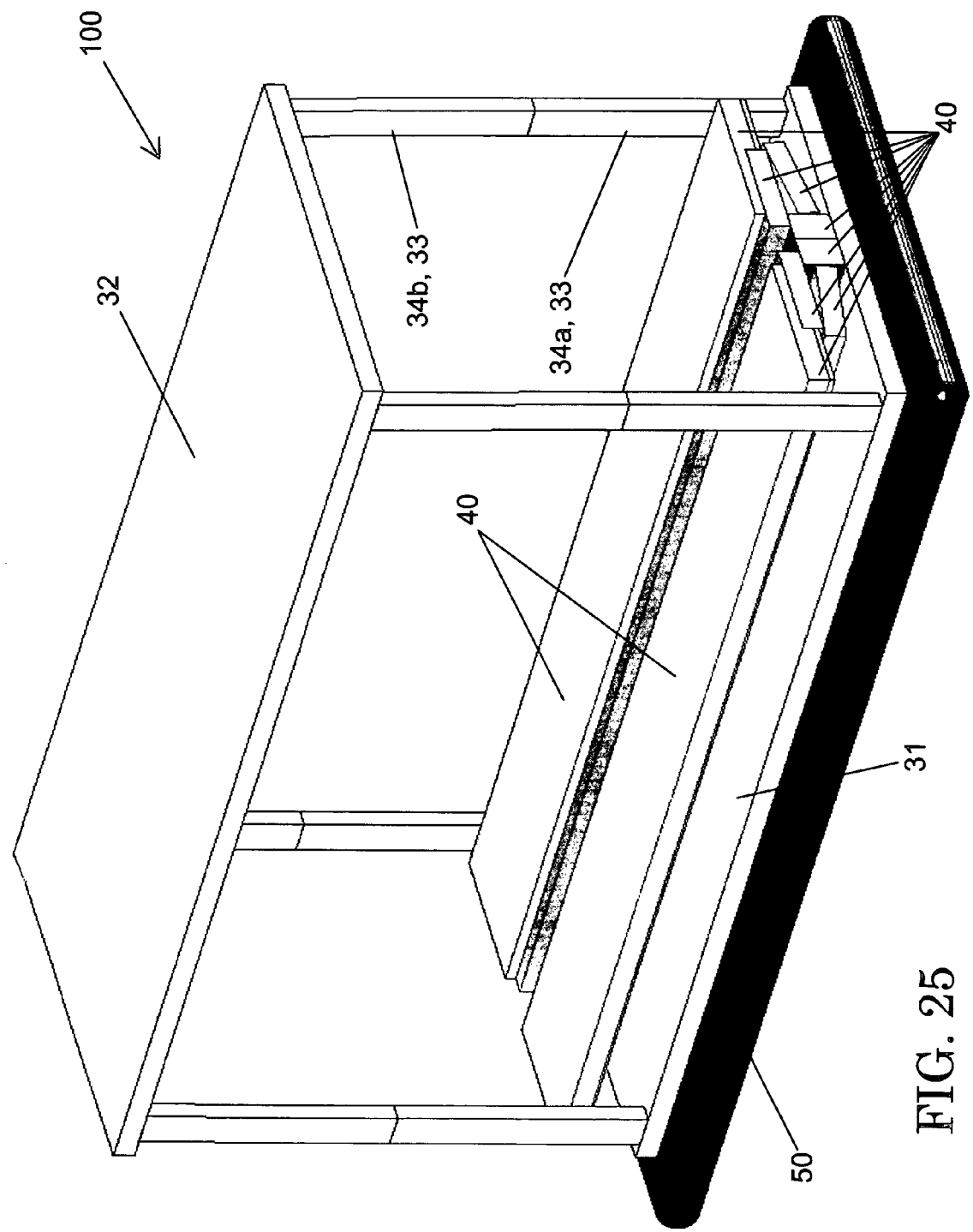
FIG. 25 is a perspective view (similar to the view of the frame in FIG. 5) of the inventive personnel transfer device shown in FIG. 1, wherein all of the inventive chairs are completely folded, and wherein the frame of the inventive personnel transfer device is completely unfolded.

Reference is now made to FIG. 25, in which frame 30 is shown to be completely unfolded, while every chair 40 is shown to be completely folded. In the processes of folding and unfolding the overall inventive device 100, the folding of the chairs 40 is performed at a stage separate from the folding of the frame 30. In folding frame 20 to a completely folded state (FIG. 7) from a completely unfolded state (FIG. 5), the folding of the chairs 40 precedes the folding of the frame 30. In unfolding frame 20 to a completely unfolded state (FIG. 5) from a completely folded state (FIG. 7), the unfolding of the frame 30 precedes the unfolding of the chairs 40. FIG. 25 portrays the inventive device 100's frame in a completely unfolded state and all individual chairs 40 in respective completely folded states. All of the chairs 40 should be folded down to their respective completely folded conditions before the frame 30 is folded down to its completely folded condition. Conversely, frame 30 should be unfolded up to its completely unfolded condition before any of the chairs 40 is folded up to its completely unfolded condition.

Inventive device 100 has a configuration adjustable for stowage such that when it is not being utilized it can be configured to occupy significantly less space than when it is being utilized. Inventive practice will thus be especially propitious in situations in which space is at a premium, such as onboard ships. Inventive device 100's frame 30 can fold and unfold as illustrated in FIG. 5 through FIG. 7. In addition, inventive device 100's individual chairs 40 can fold and unfold as illustrated in FIG. 8 through FIG. 25. As depicted in FIG. 5 and FIG. 7, the U.S. Navy's designed prototypical inventive device 100 (the "Gator Crate") in its completely folded state is approximately one-third (⅓) the height of the inventive device in its completely unfolded state. Therefore, when each of three prototypical inventive devices 100 is in its completely folded state, the aggregation of these three separate inventive devices 100 requires approximately the stowage space of one ISO container having the volumetric dimensions of the inventive device 100 when in its completely unfolded state. More generally, inventive practice usually provides for a folded-versus-unfolded differential in height such that the completely folded form of the inventive personnel transfer device is less than half the height of the completely unfolded form of the inventive personnel transfer device.

In the designing by a practitioner of the present invention of any of the multifarious embodiments of the present invention, the shape and weight criteria for the inventive personnel transfer device can include those that are applicable and scaleable to a number of commercial-sized and military-sized container structures, both standard and non-standard, such as MILVANS, QUADCONS, 20-foot ISO containers, 35-foot ISO containers, 40-foot ISO containers, etc. In the light of the instant disclosure, the ordinarily skilled artisan will appreciate the diverse fabrication methods and materials that can be used to construct the inventive personnel transfer device, including the frame (which includes the floor, the ceiling, and the posts), the chair(s), and the shock-absorbent base. Fabrication techniques known in the art that can be inventively practiced include welding, bolting and gluing. Materials known in the art that can be inventively practiced include but are not limited to varieties of (i) metals or metal alloys such as steel or aluminum, (ii) plastics, or (iii) composite materials such as fiberglass or glass-reinforced plastic (GRP).

The inventive personnel transfer device as typically practiced incorporates safety measures that help prevent injury in various ways, thus allowing for the safe transfer of personnel. People are prevented from falling from the frame and from hitting against each other while seated in the frame, particularly during transit, through the use of restraining straps (e.g., seat belts and shoulder harnesses) and side head restraints (e.g., padded dividers) situated between the people's heads. Hooks attached to the frame and/or the chairs can be implemented so that soldiers can clip themselves in. The inventive personnel transfer device includes a shock-absorbent base for preventing (or at least mitigating) injury while the container is being set down onto a surface.

Depending on the application of the present invention, circumstances may be such that the inventive personnel transfer device will be required to be hoisted and dropped a distance upon a hard surface, rather than contiguously placed thereon, in order to bring people to their destination. The shock-absorbent base 50 can be, for instance, an inflatable base, a hydraulic base, a pneumatic base, or a damping material base (e.g., made of a continuous damping material such as rubber, foam, etc.). These and other damping systems, and combinations thereof, are possible for the inventive device 100's base 50. While the inventive device 100 is being set down (e.g., onto a deck), the base 50 is sufficiently shock-absorbent so as to prevent this load from being transferred to the occupants of the inventive device.

Figure 26:
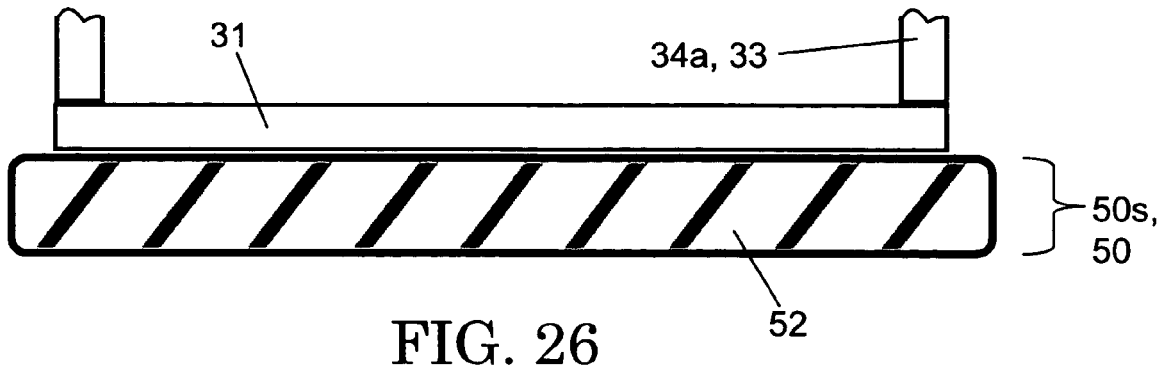
FIG. 26 through FIG. 28 are elevation views of three embodiments of the inventive personnel transfer device's shock-absorbent base, viz.: a solid elastomeric (e.g., polymeric) member, shown in FIG. 26; an airtight air cushion, shown in FIG. 27; and, a non-airtight (controlled leak) air cushion, shown in FIG. 28.
Figure 27:
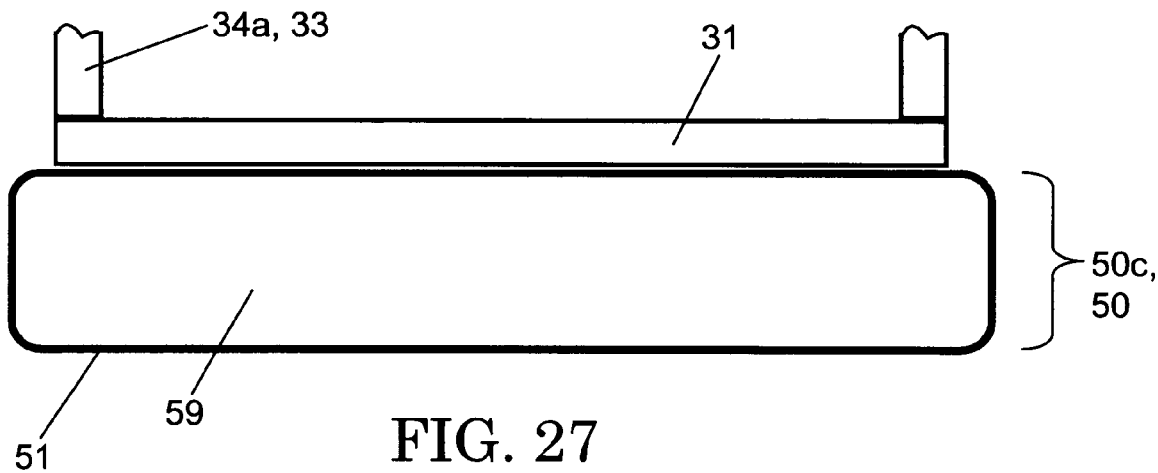
Figure 28:
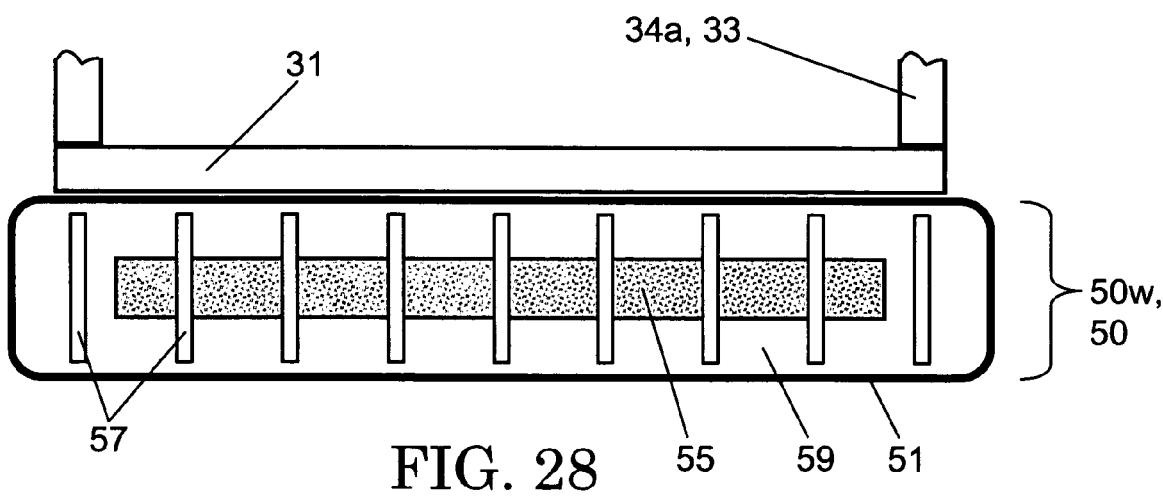

Now referring to FIG. 26 through FIG. 28, a shock-absorbent base 50 adjoins frame 30 beneath floor 31. The present invention's shock-absorbent base can be variously embodied in forms including but not limited to the following: (i) a solid member composed of a high-damping elastomeric material characterized by a low coefficient of restitution (e.g., a coefficient of restitution of less than approximately 0.1); (ii) an inflated, sealed bladder; (iii) an inflated, unsealed bladder that deflates upon impact and that self-inflates subsequent to the deflation. These are three noteworthy versions among the various versions of shock-absorbent systems that are under consideration by the present inventors for contemplated practice of the base 50 component of the U.S. Navy's prototypical inventive device 100. A common theme among these three versions is that each version represents a passive system. That is, no external power or direction is required for operation of these passive systems.

According to the energy-damping "rubber" base 50s, depicted in FIG. 26, a material 52 characterized by a low coefficient of restitution is used for the base 50. The term "coefficient of restitution" ("COR") is conventionally understood to denote a dimensionless number, between zero (0) and one (1) inclusive, representing the amount of retention or loss of energy upon the collision of two objects. Generally speaking, for a moving object bouncing off of the surface of a stationary object (such as a steel ship deck), the COR equals $V_2/V_1$, where $V_2$ is the scalar velocity of the moving object after the impact, and $V_2$ is the scalar velocity of the moving object before the impact; equivalently expressed, the COR equals $(h/H)^{1/2}$, where H is the height at which the moving object is dropped, and h is the height to which the moving object bounces. As the COR approaches 0, more energy tends to be absorbed as opposed to reflected; conversely, as the COR approaches 1, more energy tends to be reflected rather than absorbed. A golf ball or a "super ball" (basically an extremely bouncy rubber ball) is an example of an object characterized by a high COR. The present invention's base 50 should be the opposite, i.e., characterized by a low COR. A typical material suitable for inventive practice of base 50 is a synthetic rubber polymer (of any of diverse types) that allows some degree of compression but is accompanied by a high degree of energy damping. The present invention will usually be practiced so that its shock-absorbent base 50 is characterized by a coefficient of restitution of less than 0.1 when dropped upon the surface of a steel entity such as a ship deck.

A typical inflatable base 50c, depicted in FIG. 27, includes one or more inflatable bags (bladders) 51 that (typically, during fabrication of inventive device 100) is to some degree inflated (typically, partially inflated) with a fluid 59 (typically, air, but possibly a more viscous fluid). An important principle here is that a partially inflated bag will shift the contents of a bag to react against a pressure source from one specific axis or source; in doing so, it gracefully absorbs energy. An example of this would be a person flopping down into a beanbag chair; the chair molds itself around the person who just landed on it, without reflecting much energy back into the person.

The deflatible, automatically inflatable base 50w (dubbed the "whoopee cushion" by the present inventors), depicted in FIG. 28, is similar to the rubber skirt around a surface effect ship (SES) that is used to contain the air from the ship's lifting fans, thereby creating a lifting cushion for the ship. However, as distinguished from a surface effect ship's skirt (which is a continuous membrane), the present invention's base 50w has one more openings or apertures in the membrane material, such as several vertical slits 57 provided in bladder 59 as illustrated in FIG. 28. Such provision of one or more openings or apertures permits a path through which trapped fluid (e.g., air) can escape in a controlled fashion, as a load is placed on the base 50. Inventive base 50w is somewhat analogous to a conventional child's "whoopee cushion" prank device that is capable of emanating flatulence-like sound via air escape when sat upon. Inventive base 50w includes automatic re-inflation means such as including one or more foam members 55 shown in FIG. 28. Basically, as an inventive device 100 is set down upon a surface such as a ship deck, the air trapped by the bladder 59 is forced out via the slits 57 by the pressure exerted through the mass of the inventive device 100, thereby affording cushioning for the inventive device 100 (and giving rise to the present inventor's "whoopee cushion" appellation for base 50w).

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A method for transporting personnel between locations, said method comprising:

adjusting a compactable transport device from a completely compacted state to a completely non-compacted state, said adjusting including unfolding a frame from a completely folded state to a completely unfolded state, and unfolding each of at least eight chairs from said completely folded state to said completely unfolded state;

at a first location, embarking at least four passengers on said device in a completely non-compacted state, said embarking including situating said at least four passengers in said at least eight chairs, each said passenger being situated in one said chair;

hoisting said device in said completely non-compacted state with said at least four passengers embarked thereon from a first location to a second location; and at said second location, disembarking said at least four passengers from said device in said completely non-compacted state;

said device being characterized by symmetry and including a foldable frame and said at least eight foldable chairs mounted on said floor, said foldable frame including a rigid rectangular floor, a rigid rectangular ceiling, and four foldable posts, said floor and said ceiling being characterized by approximately the same rectangular size, each said post including two post sections of approximately equal length and having two post ends and a junction between said two post sections so that each said post section has one of said post ends and so that said two post sections are hingedly connected to each other at said junction, said ceiling having four ceiling corners, four ceiling edges and a ceiling geometric center; said floor having four floor corners, four floor edges and a floor geometric center, each said post being hingedly connected at a first said post end to said ceiling at a said ceiling corner and being hingedly connected at a second said post end to said floor at a said floor corner, each said chair including a seat, a chair back, a pair of lateral head restraints, and a chair support, each said restraint being hingedly connected to said chair back, said seat being hingedly connected to said chair support, said chair support being hingedly connected to said floor;

wherein when said device in said completely non-compacted state, said frame approximately describes a rectangular prismatic geometric shape having four vertical edges and four prismatic vertical rectangular sides, each said prismatic vertical rectangular side is bounded by one said ceiling edge, one said floor edge, and two said vertical edges, said at least eight foldable chairs are centrally mounted on said floor and arranged in a rectangular chair array characterized by four chair array geometric sides, each said chair array geometric side having at least two said chairs facing in a perpendicular direction with respect to one of said prismatic vertical rectangular sides, said chair array being characterized by a chair array geometric center approximately aligned vertically with said ceiling geometric center and with said floor geometric center, said post sections of each said post being approximately coaxial, said posts being approximately straight and approximately parallel to each other and approximately corresponding to said four vertical edges of said rectangular prismatic geometric shape, said ceiling and said floor approximately lying in respective geometric planes that are approximately parallel with respect to each other, said device being characterized by openness between said ceiling and said floor and between said posts;

said openness and said symmetry of said device facilitating said embarking and said disembarking of each said passenger through one of said prismatic vertical rectangular sides, and facilitating situation of each said passenger in one of said chairs facing said prismatic vertical rectangular side through which said passenger embarks and disembarks;

said embarking and said disembarking of said at least four passengers being performed so that each of said four prismatic vertical rectangular sides has at least one said passenger embarking and disembarking therethrough.

2. The method for transporting personnel of claim 1, wherein said device includes a shock-absorbent base that adjoins said frame beneath said floor, and wherein said hoisting of said device includes, prior to said disembarking of said at least one passenger, placing said device in a completely non-compacted state upon a surface at said second location so that said shock-absorbent base, but neither said frame nor said at least one chair, contacts said surface.

3. The method for transporting personnel of claim 2, said method further comprising, subsequent to said disembarking of said at least one passenger, adjusting said device from a completely non-compacted state to a completely compacted state, said adjusting including folding said frame from a completely folded state to a completely unfolded state, and folding each of said at least one chair from a completely unfolded state to a completely folded state.

4. The method for transporting personnel of claim 3, wherein:

said folding of said frame includes folding each said post from a completely unfolded state to a completely folded state, said folding of each said post including rotating a first said post section toward said ceiling, rotating a second post section toward said floor, and rotating said post sections toward each other;

said folding of each said chair includes rotating each said lateral head restraint toward said chair back, rotating said seat toward at least one of said chair back and said support, and rotating said support toward said floor;

said unfolding of said frame includes unfolding each said post from a completely folded state to a completely unfolded state, said unfolding of each said post including rotating a first said post section away from said ceiling, rotating a second post section away from said floor, and rotating said post sections away from each other;

said unfolding of each said chair includes rotating each said lateral head restraint away from said chair back, rotating said seat away from at least one of said chair back and said support, and rotating said support away from said floor.

5. The method for transporting personnel of claim 4, said method further comprising, subsequent to said adjusting of said device from a completely non-compacted state to a completely compacted state, positioning said device in a completely compacted state in a stowage compartment.

6. A method for transporting personnel between locations, said method comprising:

at a first location, embarking at least four passengers on said device in a completely non-compacted state, said embarking including situating said at least four passengers in at least eight chairs, each said passenger being situated in one said chair;

hoisting said device in a completely non-compacted state with said at least four passengers embarked thereon from said first location to a second location;

at said second location, disembarking said at least four passengers from said device in completely non-compacted state; and subsequent to said disembarking of said at least four passengers, adjusting said device from said completely non-compacted state to a completely compacted state, said adjusting including folding said frame from a completely folded state to a completely unfolded state, and folding each of said at least eight chairs from said completely unfolded state to said completely folded state;

said device being characterized by symmetry and including a foldable frame and said at least eight foldable chairs mounted on a floor, said foldable frame including a rigid rectangular floor, a rigid rectangular ceiling, and four foldable post, said floor and said ceiling being characterized by approximately the same rectangular size, each said post including two post sections of approximately equal length and having two post ends and a junction between said two post sections so that each said post section has one of said post ends and so that said two post sections are hingedly connected to each other at said junction, said ceiling having four ceiling corners, four ceiling edges and a ceiling geometric center; said floor having four floor corners, four floor edges and a floor geometric center, each said post being hingedly connected at a first said post end to said ceiling at a said ceiling corner and being hingedly connected at a second said post end to said floor at a said floor corner, each said chair including a seat, a chair back, a pair of lateral head restraints, and a chair support, each said restraint being hingedly connected to said chair back, said seat being hingedly connected to said chair support, said chair support being hingedly connected to said floor;

wherein when said device in said completely non-compacted state, said frame approximately describes a rectangular prismatic geometric shape having four vertical edges and four prismatic vertical rectangular sides, each said prismatic vertical rectangular side is bounded by one said ceiling edge, one said floor edge, and two said vertical edges, said at least eight foldable chairs are centrally mounted on said floor and arranged in a rectangular chair array characterized by four chair array geometric sides, each said chair array geometric side having at least two said chairs facing in a perpendicular direction with respect to one of said prismatic vertical rectangular sides, said chair array being characterized by a chair array geometric center approximately aligned vertically with said ceiling geometric center and with said floor geometric center, said post sections of each said post being approximately coaxial, said posts being approximately straight and approximately parallel to each other and approximately corresponding to said four vertical edges of said rectangular prismatic geometric shape, said ceiling and said floor approximately lying in respective geometric planes that are approximately parallel with respect to each other, said device being characterized by openness between said ceiling and said floor and between said posts;

said openness and said symmetry of said device facilitating said embarking and said disembarking of each said passenger through one of said prismatic vertical rectangular sides, and facilitating situation of each said passenger in one of said chairs facing said prismatic vertical rectangular side through which said passenger embarks and disembarks;

said embarking and said disembarking of said at least four passengers being performed so that each of said four prismatic vertical rectangular sides has at least one said passenger embarking and disembarking therethrough.

7. The method for transporting personnel of claim 6, wherein said device includes a shock-absorbent base that adjoins said frame beneath said floor, and wherein said hoisting of said device includes, prior to said disembarking of said at least one passenger, placing said device in a completely non-compacted state upon a surface at said second location so that said shock-absorbent base, but neither said frame nor said at least one chair, contacts said surface.

8. The method for transporting personnel of claim 7, said method further comprising, subsequent to said adjusting of said device from a completely non-compacted state to a completely compacted state, positioning said device in a completely compacted state in a stowage compartment.

\* \* \* \* \*